United States Patent
Peffers et al.

(10) Patent No.: US 11,494,320 B2
(45) Date of Patent: Nov. 8, 2022

(54) DELAYED LINK COMPRESSION SCHEME

(71) Applicant: Intel Corporation, Santa Clara, CA (US)

(72) Inventors: Simon N Peffers, Acton, MA (US); Kirk S Yap, Westborough, MA (US); Sean Gulley, Sudbury, MA (US); Vinodh Gopal, Westborough, MA (US); Wajdi Feghali, Boston, MA (US)

(73) Assignee: Intel Corporation, Santa Clara, CA (US)

( * ) Notice: Subject to any disclaimer, the term of this patent is extended or adjusted under 35 U.S.C. 154(b) by 815 days.

(21) Appl. No.: 16/140,472

(22) Filed: Sep. 24, 2018

(65) Prior Publication Data

US 2019/0042496 A1 Feb. 7, 2019

(51) Int. Cl.
| | | |
|---|---|---|
| *G06F 13/16* | (2006.01) | |
| *H04L 29/06* | (2006.01) | |
| *G06F 13/28* | (2006.01) | |
| *G06F 13/40* | (2006.01) | |
| *H04L 69/04* | (2022.01) | |

(52) U.S. Cl.
CPC .......... *G06F 13/1673* (2013.01); *G06F 13/28* (2013.01); *G06F 13/4004* (2013.01); *H04L 69/04* (2013.01)

(58) Field of Classification Search
CPC .. G06F 13/1673; G06F 13/28; G06F 13/4004; H04L 69/04
See application file for complete search history.

(56) References Cited

U.S. PATENT DOCUMENTS

| | | | | |
|---|---|---|---|---|
| 6,377,573 | B1 * | 4/2002 | Shaffer | H04M 7/006 370/356 |
| 6,621,813 | B2 * | 9/2003 | Petch | H04J 3/0682 370/324 |
| 10,277,716 | B2 * | 4/2019 | Bhaskar | H04L 69/04 |
| 10,924,591 | B2 * | 2/2021 | Feghali | H04L 47/62 |
| 2010/0329256 | A1 * | 12/2010 | Akella | H04L 47/10 370/392 |
| 2016/0055093 | A1 * | 2/2016 | Turner | G06F 12/0893 711/118 |
| 2016/0309363 | A1 * | 10/2016 | Persson | H04L 69/22 |
| 2019/0014055 | A1 * | 1/2019 | Gupta | H04L 47/50 |
| 2020/0275311 | A1 * | 8/2020 | Zhao | H04L 47/323 |

* cited by examiner

Primary Examiner — Abdullahi E Salad
(74) Attorney, Agent, or Firm — Compass IP Law PC

(57) ABSTRACT

Apparatus, systems and methods for implementing delayed decompression schemes. As a burst of packets comprising compressed packets and uncompressed packets are received over an interconnect link, they are buffered in a receive buffer without decompression. Subsequently, the packets are forwarded from the receive buffer to a consumer such as processor core, with the compressed packets being decompressed prior to reaching the processor core. Under a first delayed decompression approach, packets are decompressed when they are read from the receive buffer in conjunction with forwarding the uncompressed packet (or uncompressed data contained therein) to the consumer. Under a second delayed decompression scheme, the packets are read from the receive buffer and forwarded to a decompressor using a first datapath width matching the width of the packets, decompressed, and then forwarded to the consumer using a second datapath width matching the width of the uncompressed data.

29 Claims, 22 Drawing Sheets

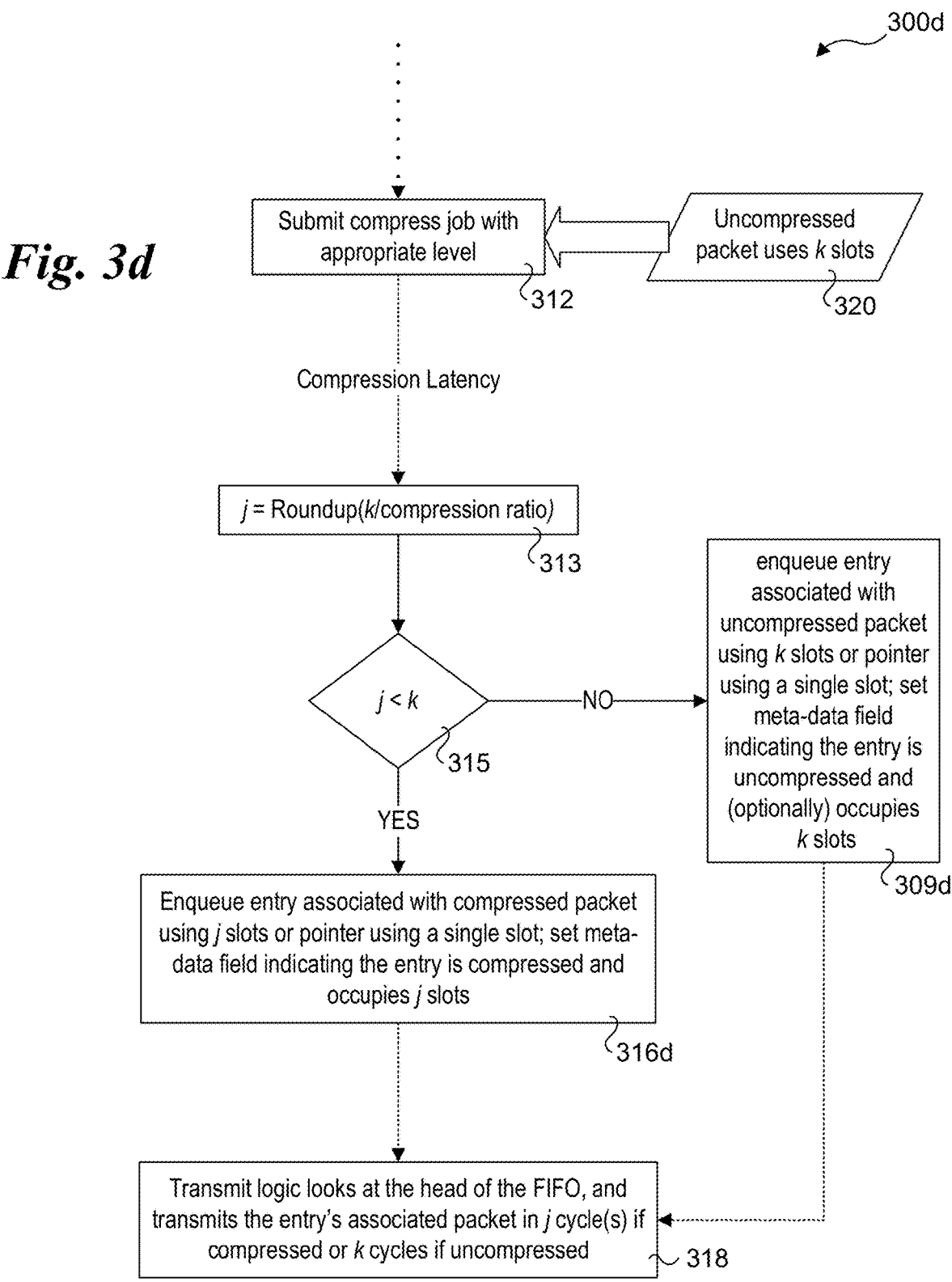

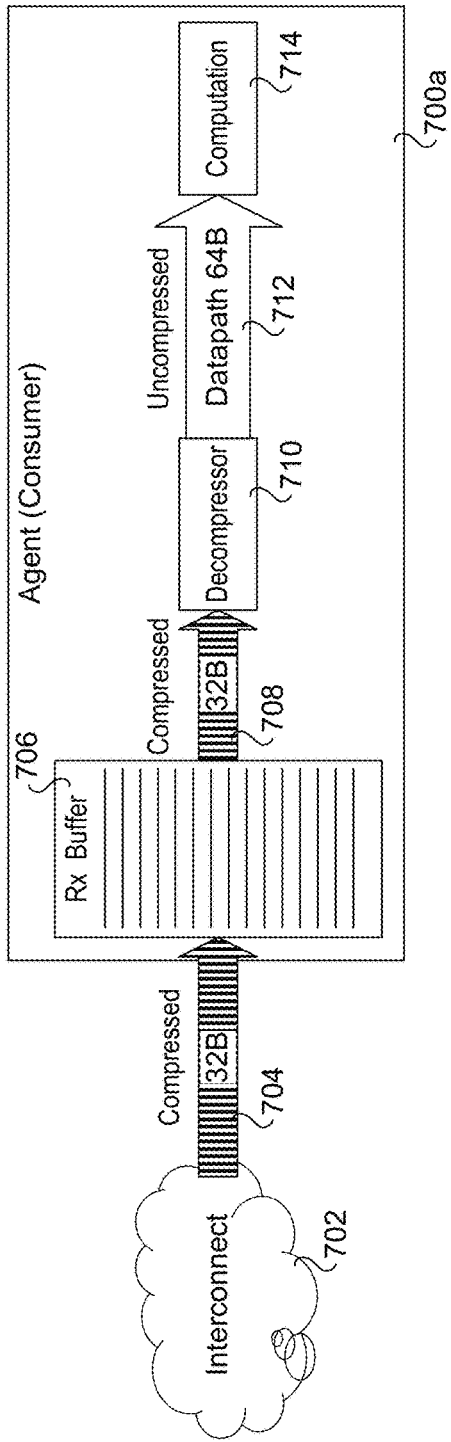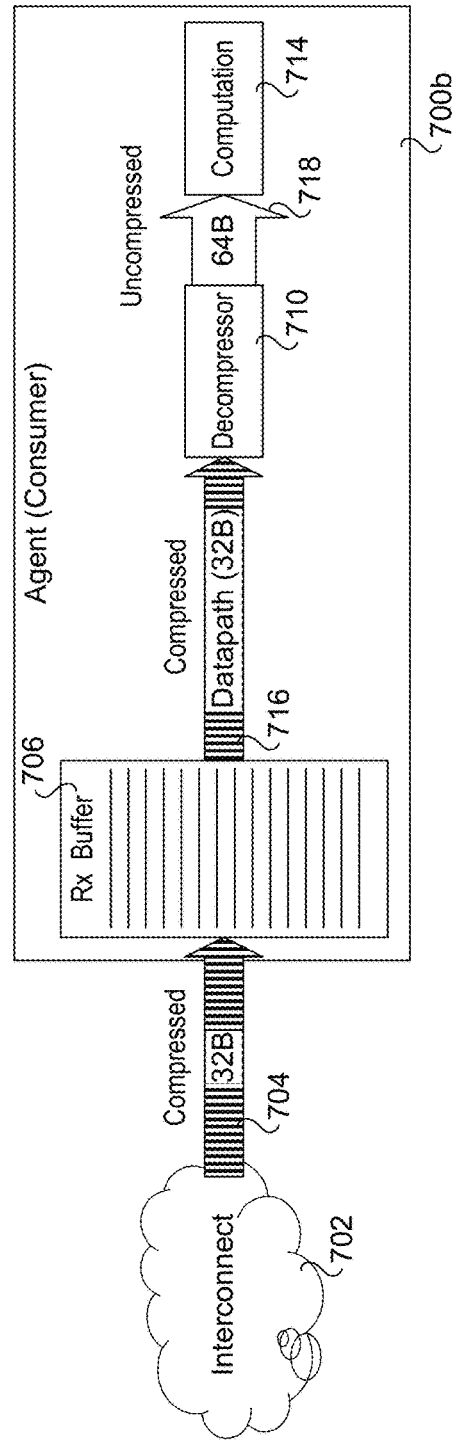

DELAYED LINK COMPRESSION SCHEME

CROSS-REFERENCE TO APPLICATION CONTAINING RELATED SUBJECT MATTER

Portions of the subject matter of this application are commonly disclosed in U.S. application Ser. No. 16/014,690, entitled LOW-LATENCY LINK COMPRESSION SCHEMES, filed on Jun. 21, 2018. Each of this application and U.S. application Ser. No. 16/014,690 share the same set of inventors, and is subject to assignment to Intel Corporation.

BACKGROUND INFORMATION

As processors and networks get ever more faster, the transfer of data across interconnects becomes increasingly important. For example, communication between components in a processor, such as processor cores, memory controllers, input/output (IO) interfaces, involves transfer of data over high speed interconnects, which historically employed buses but today generally employs high-speed serial links. In addition to data communications within processors, there are also high-speed interconnects between processors and other system components, including IO devices such as network interfaces and host controller adapters. For multi-processor systems, such as servers employing Non-Uniform Memory Access (NUMA) architectures, there are high-speed interconnects used to connect the processors that are referred to as socket-to-socket interconnects. Additionally, high-speed interconnects, such as Ethernet, may be used for communication between platforms.

Problems may arise under which the transfer rate supported by an IO or socket-to-socket interconnect (i.e., the interconnect bandwidth) can't keep up with the bandwidth requirements of data producers and/or consumers in the system. This is generally addressed (to a limited degree) by using various transmit and receive buffers and/or queues at the interfaces to the interconnect links; however, once the buffers/queues get filled, the interconnect links become bottlenecks, reducing system performance.

One approach to improving interconnect throughput is to use compression. Under this approach, data (to be transferred over the link) is compressed at the send side of link and decompressed at the receive side of the link. Generally, the data path at the receive side of such a connection is carefully designed to match the throughput of the interconnect itself. However, naïvely decompressing that data as it egresses would burst data to a multiple of the supported throughput, requiring the data path to be expanded.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 3d is a flowchart illustrating an augmentation to the flowchart of FIG. 3b using an alternative scheme under which multiple levels of compression are supported and packets and queued and transmitted using a number of transmit cycles that are a function of the compression ratios of the packets;

FIG. 7a illustrates an abstracted view of a first delayed decompression scheme under which decompression is delayed until cacheline data is read from the Rx buffer, according to one embodiment;

FIG. 7b illustrates an abstracted view of a second delayed decompression scheme under which decompression is delayed until cacheline data is forwarded to a computation block, according to one embodiment;

DETAILED DESCRIPTION

Figure 1:
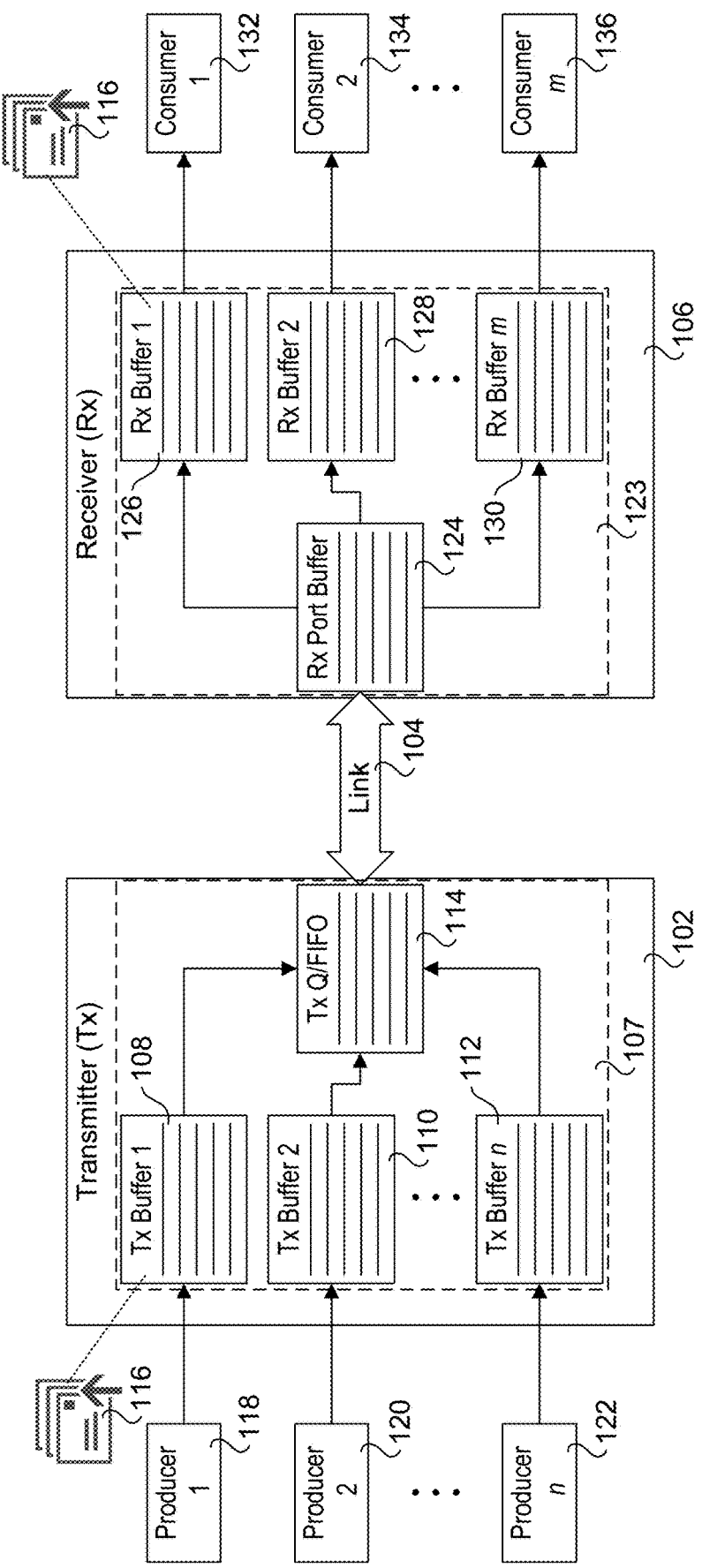
FIG. 1 illustrates a first conventional link architecture under which packets or messages from multiple producers are buffered in respective transmit buffers and selectively enqueued in a transmit queue/FIFO for transmission over a link.

Embodiments of apparatus, systems and methods for implementing delayed decompression schemes are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

In accordance with aspects of the embodiments described herein, low-latency link compression and delayed decompression schemes and related techniques are disclosed that facilitate higher throughput than available via the nominal link bandwidth of interconnect links with little to no impact on latency. Additional aspects of exemplary embodiments include very high throughput for compression and decompression, operation on small block sizes, and low added design complexity and power foot-print. To better understand operations of the embodiments and to better appreciate the advantages provided by the embodiments, the following description of conventional link architectures and operations is provided.

Figure 1A:
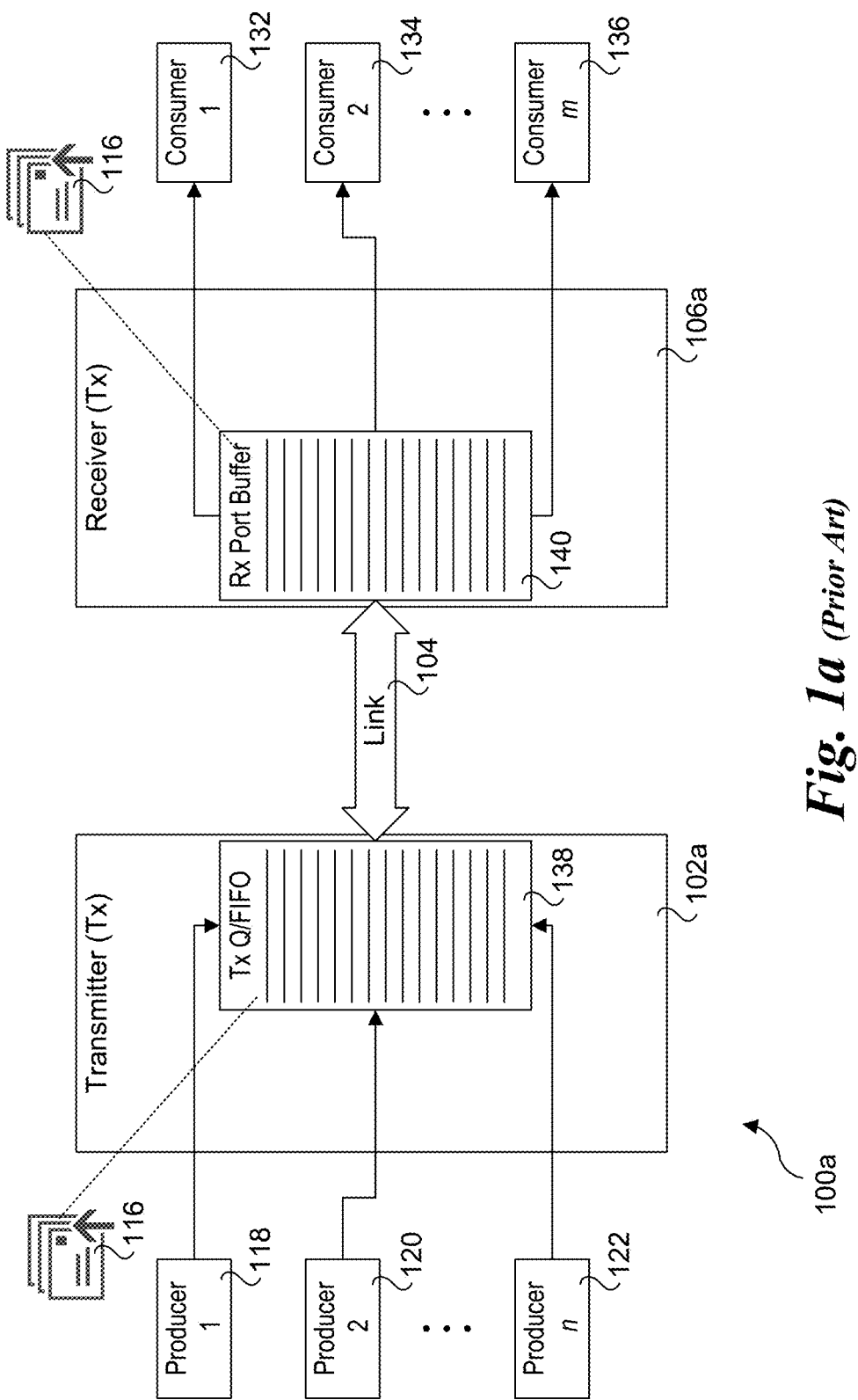
FIG. 1a illustrates a second conventional link architecture under which packets or messages from multiple producers are directly enqueued in a transmit queue/FIFO for transmission over a link.

FIGS. 1 and 1a illustrate examples of buffer/queue and link contention issues with data transmission using conventional link interfaces. As shown in link architecture 100 of FIG. 1, a transmitter (Tx) 102 transmits data over a link 104 to a receiver (Rx) 106. Transmitter 102 is depicted as implementing a transmit buffer/queue hierarchy 107, which includes n Tx buffers (depicted as a Tx buffers 108, 110, and 112) and a Tx queue/FIFO (First-in, First-out) 114. In the illustrated embodiment, each Tx buffer is used to buffer packets and/or messages 116 from a respective producer 1 . . . n, depicted as producers 118, 120, and 122.

Transmit buffer/queue hierarchy 107 is illustrative of various transmit buffer/queue configurations. For example, under one approach, packets or messages 116 are stored in each of Tx buffers 108, 110, and 112, while pointers to the packets or messages are stored in Tx queue/FIFO 114. The pointers are processed in FIFO order. For a given pointer, the corresponding packet/message is retrieved (i.e., read) from the applicable Tx buffer, and buffered in a transmit output buffer (not shown) prior to being transmitted over link 104. Under one approach, the packet or message data is pulled from the applicable Tx buffer and added to an output bitstream that is transmitted over link 104.

Under another approach, the packets in Tx buffers 108, 110, and 112 are pulled into Tx queue/FIFO 114 or otherwise copied into FIFO slots in Tx queue/FIFO 114 using a Tx scheduler or the like (not shown). In some implementations, the Tx buffers are implemented as FIFO queues, while in other implementations the packets/messages are stored in Tx buffers in a manner that is not ordered.

Receiver 106 includes a receive buffer hierarchy 123, including an Rx port buffer 124 at a first level of the hierarchy and m Rx buffers, depicted as Rx buffers 126, 128 . . . 130, at a second level of the receive buffer hierarchy. Each of the m Rx buffers is associated with a respective consumer, as depicted by consumers 132, 134 . . . 136 (also labeled and referred to herein as consumer 1, 2 . . . m). Generally, the number of consumers m may be less than, equal to, or greater than the number of producers n. Depending on the implementation, an agent or other logic associated with receiver 106 (not shown) may push packets/messages into the second level Rx buffers, or distributed logic may pull packets messages from Rx port buffer 124 into Rx buffers 126, 128 . . . 130. For example, logic associated with Rx port buffer 124 (not shown) may inspect packet headers and either cause packets to be forwarded to the appropriate second level buffers or coordinate with an agent or the like associated with one or more second level buffers to pull packets from Rx port buffer 124 based on the packet header information. As another option, consumers 132, 134 . . . 136 may not be associated with a respective second level Rx buffer, and packets in the second level Rx buffers are forwarded to consumers via a virtual switch (not shown) or other routing mechanism.

Under link architecture 100a of FIG. 1a, the n producers 118, 120 . . . 122 forward (or otherwise place) packets or messages in a Tx queue/FIFO 138 in a transmitter 102*a*. Meanwhile, receiver 106*a* includes an Rx port buffer 140 from which packets or messages are forwarded to the m consumers 132, 134 . . . 136 or otherwise the m consumers pull the packets from Rx port buffer 140. As before, the Tx queue/FIFO may either store packets and/or messages, or store pointers to the packets/messages.

Returning to link architecture 100 of FIG. 1, there are various scenarios where link contention issues may arise. First, if the n producers collectively produce data (i.e., packets/messages) to be sent at a rate that is greater than the bandwidth of link 104, one or more of the Tx buffers will get filled, which will generally be handled by throttling the amount of data being inserted into the Tx buffer(s) by the producers. Some link embodiments may employ a reliable transport mechanism that guarantees delivery of packets/ messages over the link. This will result in a portion of the link bandwidth being used for resending messages and/or ACKnowledgements (ACKs). Under some implementations, the reliable transport mechanism is implemented at the Link layer, as described below.

Similarly, under the link architecture 100*a* of FIG. 1*a*, if the n producers produce data at a rate that is greater than the link bandwidth for link 104, the Tx queue/FIFO will eventually become overfilled (e.g., filled beyond a predetermined threshold), and an appropriate action will be applied to the producers to prevent the Tx queue/FIFO from becoming completely full.

Link buffer contention issues may also occur downstream—that is at the receiver. In this case, either the Rx port buffer reaches an overfill level or one of the Rx buffers reaches an overfill level. To prevent additional data from being received (or otherwise to effectively throttle the rate at which data is being received), various mechanisms may be implemented using well-known techniques. In some implementations, a link credit mechanism is used under which a sender (e.g., transmitter 102 or 102*a*) has to have enough credit to send additional data. For example, credit-based flow control may use this approach, wherein the flow may be managed at one or more of a physical link level or a virtual channel level.

In accordance with aspects of the embodiments now disclosed, techniques and associated mechanisms are disclosed that dynamically compress packets and/or messages on a selective basis to prevent buffer overflow and reduce or eliminate link contention issues. The scheme is flexible and scalable, enabling the use of compression to be adapted based on current parameters and link conditions, such as buffer and queue fill levels.

In implementing a transmission scheme with dynamic compression, the biggest challenge is the impact to latency. Under the embodiments described herein, the main idea is that the compression is not added to the data-path, but sits on the side of the transmit queue. The system monitors the queue depth and, accordingly, initiates compression jobs based on the depth. In some embodiments, different compression levels are supported dynamically depending on queue depth. In addition, packets can be marked as part of critical or non-critical flows, which affects whether they are target for compression.

Figure 2:
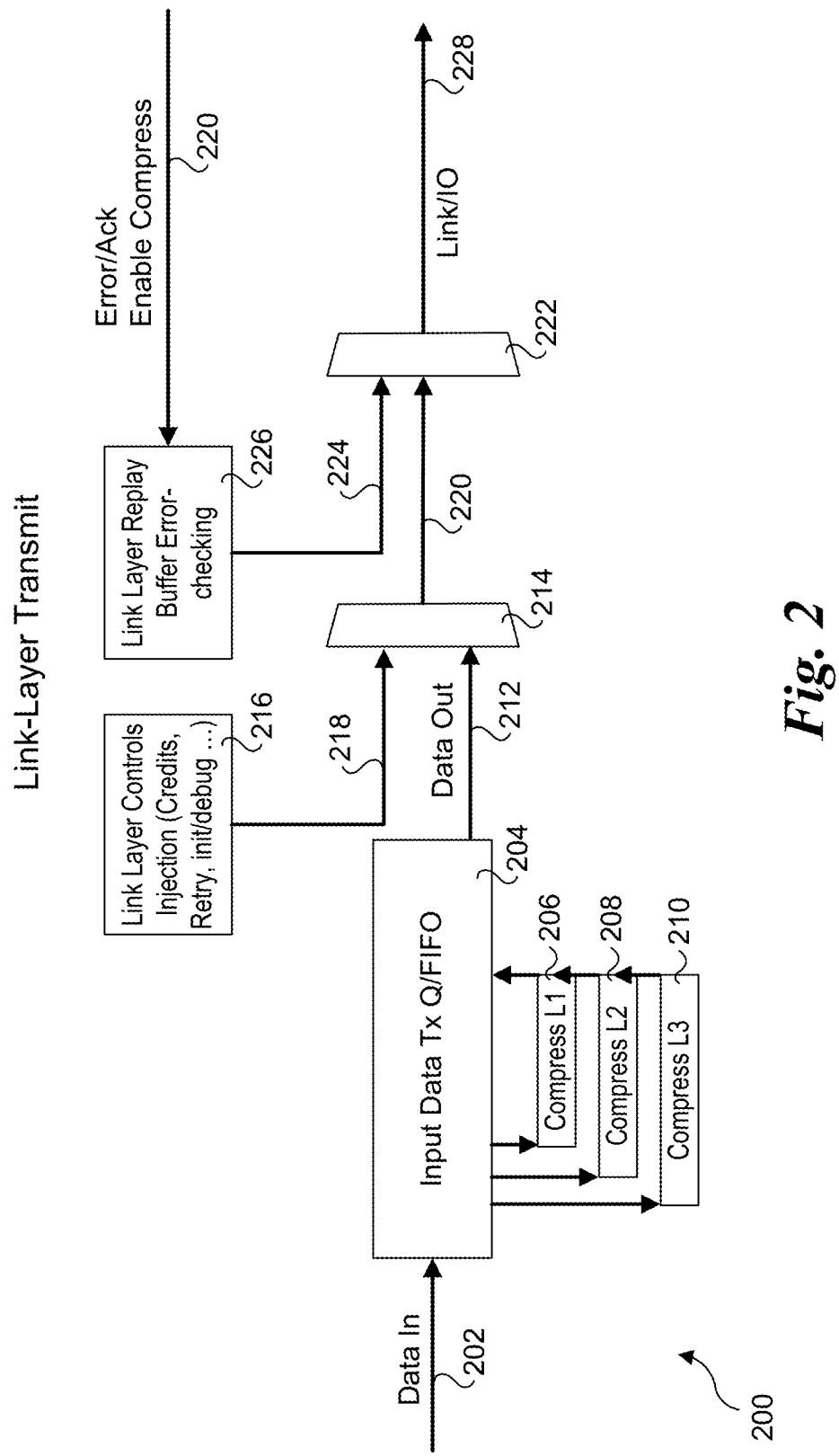
FIG. 2 is a schematic diagram illustrating aspects of a low-latency link compression scheme, according to one embodiment.

FIG. 2 shows a Link-layer transmit architecture 200 configured to implement aspects of the dynamic low-latency link compression scheme, according to one embodiment. Data 202, such as packets and/or messages, is input to an input data Tx queue/FIFO 204. Compressors 206, 208 and 210 are configured to selectively access data stored in Tx queue/FIFO 204 and perform compression operations on the data. Under one approach, the compressors are stacked similar to what is illustrated in FIG. 2, where each level in the stack (e.g., L1, L2, L3), performs a different compression operation. Under another approach, separate compressors or compression engines are used that support different levels of compression. As will be described in further detail below, input data Tx queue/FIFO may be implemented as multiport memory, supporting multiple concurrent read and write accesses.

Output data 212 is read out of input data Tx queue/FIFO 204 (or otherwise forwarded by Tx queue/FIFO 204) and provided as an input to a multiplexer 214. A link layer control block 216 injects Link layer control information 218 into multiplexer 214. For example, the Link layer control information might include credits, retry requests, information relating to initiating a link or debugging a link, etc.

The output 220 of multiplexer 214 is fed into one of the inputs of second multiplexer 222. The second input 224 of multiplexer 222 is provided by a Link layer replay buffer error checking block 226. As will be described below, some embodiments may employ a replay buffer at the Link layer under which reliable packets or messages or buffered in the replay buffer until some indicia is received or determined that the reliable packet or message has been successfully transferred over the link without error.

The output of multiplexer 222 is a bitstream including data corresponding to either an original transmission of a packet/message (if input 220 is selected) or retransmission of a packet/message from the replay buffer (if input 224 is selected), under which the selected packet or message is transmitted as a bitstream over a link or IO interconnect 228. For simplicity, link/IO 228 is shown as a single arrow that is representative of both single- and multi-lane links/interconnects, as well as bus-type interconnects. As further shown in FIG. 2, Link layer replay buffer and error checking block may receive inputs 230 from a link peer interface (not shown) comprising one or more of error indicia, ACKnowledgements, and enable compression indicia.

Aspects of the flow in FIG. 2 are implemented in the Tx queue/FIFO that receives the data packets to be transmitted. In one embodiment, the three compression engines shown have an extra cycle latency with respect to the previous level compressor, but write back at the same time.

Figure 3A:
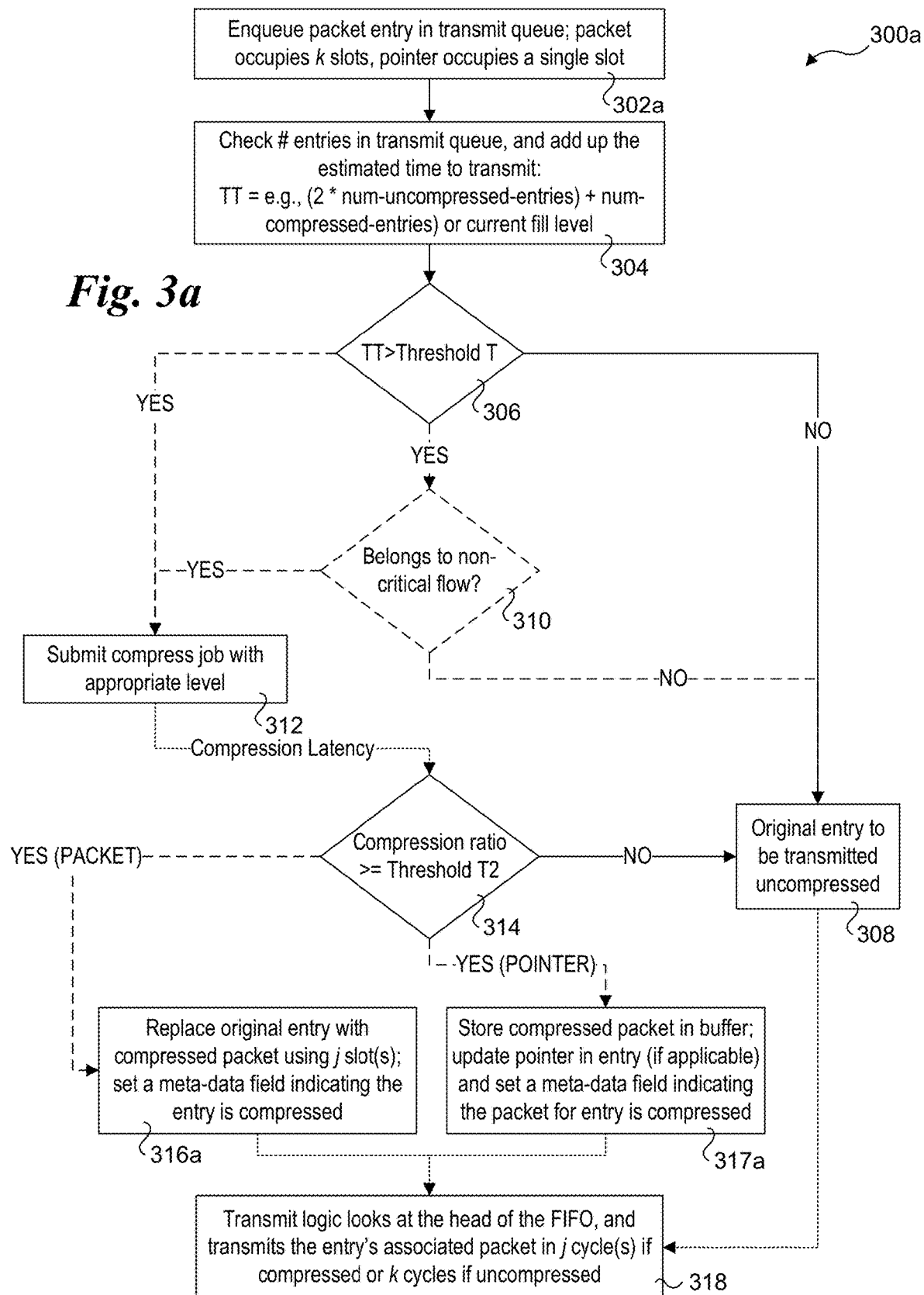
FIG. 3a is a flowchart illustrating operations and logic for implementing low-latency link compression schemes under which packets or messages are enqueued in a transmit queue prior to being dynamically selected for compression, according to one embodiment.
Figure 3B:
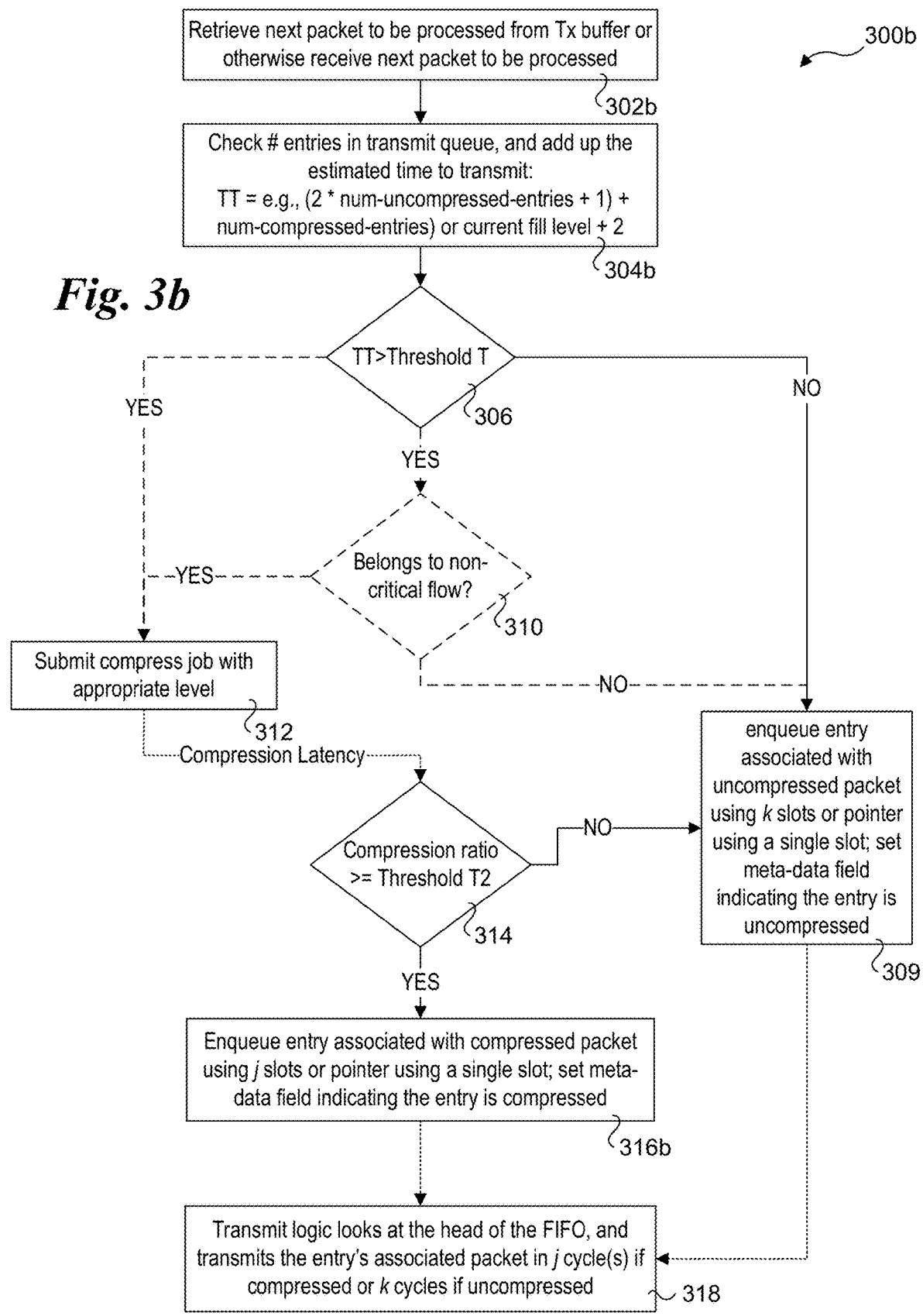
FIG. 3b is a flowchart illustrating operations and logic for implementing low-latency link compression schemes under which packets or messages are dynamically selected for compression prior to being enqueued in a transmit queue, according to one embodiment.

FIG. 3*a* shows a flowchart 300*a* illustrating operations and logic for implementing low-latency dynamic compression, according to a first embodiment under which packets or messages are enqueued in a transmit queue prior to selective compression of the packets. For simplicity, the operations of flowchart 300*a* in FIG. 3*a* and flowchart 300*b* in FIG. 3*b* are described in terms of processing packets. Some link technologies use the term "messages" rather than packets. Accordingly, similar operations illustrated in flowcharts 300*a* and 300*b* may be performed using messages rather than packets. In addition, some of the operations depicted in flowcharts 300*a* and 300*b* are implementing under a transmit queue that stores packets or messages in either compressed or uncompressed forms. It will be understood by those having skill in the art that similar operations may be performed under which pointers to the packets or messages are enqueued as entries in the transmit queue rather than the packets or messages themselves.

The processing of flowchart 300*a* begins in a block 302*a*, where a new packet entry is enqueued in the transmit queue. If the packet itself is enqueued, then that packet will take up k slots in the transmit queue, where k is an integer. For example, non-limiting examples of k include 2 and 3, meaning the (original) packet will occupy 2 or 3 slots in the Tx queue. If a pointer scheme is used under which the Tx queue stores pointers to packets or messages rather than the packets or messages themselves, then the new packet entry will occupy a single slot in the Tx queue. Along with the pointer, the new packet entry may include indicia (e.g., meta-data) indicating the packet is (currently) uncompressed.

In a block 304a, the number of entries in a transmit queue are checked, and an estimated time to transmit TT is determined. For example, the estimated time to transmit might be calculated based on the number of uncompressed entries and the number of compressed entries, such as, $$TT = (2*\text{number-uncompressed-entries}) + \text{number-compressed-entries} \quad (1)$$

If packets themselves are stored in the transmit queue, the TT value may equate to a fill level of the transmit queue (e.g., the total number of Transmit queue slots occupied by compressed and uncompressed packet data). For a circular FIFO, the current fill level of the FIFO can be determined by counting the number of FIFO slots that currently have valid entries.

In a decision block 306, a determination is made to whether the TT value calculated in block 304 is greater than a first threshold T. In one embodiment, the threshold T is determined as a function of the latency added to compress the packet on the transmit side and decompress the packet on the receive side. For example, if the minimum latency of compressor is C cycles, and latency of decompressor on receive side is D cycles, a threshold T (in cycles) can be chosen as (C+D). The general concept here is that the compression and decompression operations preferably should not add any latency relative to how much time it would take to transmit the uncompressed packet using the normal transmission data-path. If there is sufficient transmit time, this means the packet can be compressed and decompressed without adding any latency relative to the non-compressed transmission time along the Tx data-path.

If TT<=T, the answer to decision block 396 is NO, and the logic proceeds to a block 308 indicating the original entry (e.g., packet or message) is to be transmitted uncompressed (in accordance with transmit operations performed in a block 314 described below). If the TT value is greater than the threshold T, the answer to decision block 306 is YES, and the logic proceeds to an optional decision block 310 in which a determination is made to whether the packet/message is marked as belonging to a non-critical flow. If the answer is NO, the packet/message belongs to a critical flow and the original entry is left uncompressed, as depicted in block 308.

If the answer to decision block 310 is YES, or if optional decision block 310 is not used and the answer to decision block 306 is YES, then a compression job for the packet/message is submitted at an appropriate compression level in a block 308. For an original packet that is stored in the transmit queue, the packet data will be read from the transmit queue and compressed by a compressor using the appropriate compression level. If a pointer to the packet is stored in the transmit queue, then the packet data will be read from a buffer pointed to by the pointer and compressed by the compressor.

Following compression of the packet, the logic proceeds to a decision block 314 in which a determination is made to whether the compression ratio of the compressed packet is equal or greater than a second threshold T2. For example, T2 may be some predetermined compression ratio, such as 2:1. If the answer to decision block 314 is NO, the original uncompressed transmit will be transmitted, as depicted by block 308, and the compressed packet is discarded. If the answer to decision block 314 is YES and packets are being stored in the transmit queue, the logic proceeds to a block 316a in which the original uncompressed entry is replaced with the compressed packet using j slots. In addition, in one embodiment indicia in a meta-data field is also set indicating the entry is compressed. For example, in one non-limiting example, an original uncompressed packet is stored in the TX queue using two slots (k=2); when the original uncompressed packet is replaced with the compressed packet, it only occupies a single slot (j=1).

If the answer to decision block 314 is YES and pointers to packets are being stored in the transmit queue, the logic proceeds to a block 317a in which the compressed packet is stored in a buffer and the pointer for the entry associated with the (now) compressed packet is updated, as applicable and the meta-data field is set indicating the entry corresponds to a compressed packet. In some embodiments, the original packet will be buffered in a first buffer, and the compressed packet will either be buffered in a different buffer or at a different location in the first buffer, necessitating an update to the pointer. In other embodiments, the original uncompressed packet data is overwritten with the compressed packet data using the same address for the start of the packet, and thus the pointer would not be updated. In one embodiment where a single compression ratio threshold is used, the meta-data field may be composed of a single bit used to whether the packet is compressed or not.

In block 318, the transmit logic looks at the head of the FIFO, selects the entry and transmits the entry's associated packet using j transmission cycles if the packet is compressed, otherwise the original uncompressed packet is transmitted over k cycles. For example, in one embodiment that uses a nominal 2:1 compression scheme, threshold T2 is 2:1, j=1, and k=2. For a nominal 3:1 compression scheme, T2=3:1, j=1, and k=3. For a nominal 3:2 compression scheme, T2=3:2, j=2, and k=3.

Under a second approach, selective dynamic compression of packets is performed prior to enqueuing packets in the transmit queue, as depicted in flowchart 300b in FIG. 3b. The process begins in a block 302b in which a next packet to be processed is retrieved from a transmit buffer or otherwise received for processing (e.g., from a producer or from an agent associated with a link interface). The operation of block 304b is the same as before, except the TT may further include the additional time to transmit the packet.

In response to a NO answer for decision block 306, the logic proceeds to a block 309 in which an entry associated with the uncompressed packet is enqueued in the transmit queue. For example, if the transmit queues is used to store the packets themselves, then the entry that is enqueued includes the packet (which will occupy k slots) along with meta-data indicating the packet is uncompressed. If a pointer scheme is used, the entry includes a pointer to the uncompressed packet occupying a single slot along with meta-date indicating the packet is uncompressed.

Generally, the operations and associated logic for optional decision block 310, block 312, and decision block 314 are the same as in FIG. 3a, except the NO branches flow to block 309 rather than 308. If the answer to decision block 314 is YES, the logic proceeds to a block 312 wherein an entry associated with the compressed packet is enqueued either comprising the compressed packet and occupying j slots or comprising a pointer to the compressed packet occupying a single slot. In addition, a meta-data field is set to indicate the entry corresponds to a compressed packet. For packets that are compressed but are not stored in the queue, the packet data is stored in a buffer pointed to by the pointer.

As before, in block 318, the transmit logic looks at the head of the FIFO and selects a compressed entry if it exists for transmission using j cycles, otherwise the original entry is selected to be transmitted over k cycles. For entries having the associated packet stored in the transmit queue, the entry is copied to the output transit port buffer and subsequently transmitted using a serial or bus-type transmission scheme, depending on the type of link being used. For entries that are pointers, the compressed or uncompressed packet is retrieved (e.g., read) from the buffer location the pointer points to and copied to the output transit port buffer and subsequently transmitted.

As illustrated in FIG. 2 and described above, different levels of compression may be used within the same implementation, such as but not limited to 2:1, 3:1, and 3:2; as such, the indicia in the meta-data field may also indicate one or more of a compression level and type of compression used so the decompressor on the receive side will know what decompression process to use. In one embodiment, for a 3:1 threshold, the uncompressed packet will occupy three FIFO slots (k=3), while the compressed packet will occupy a single slot. For 3:2 compression threshold, the uncompressed packet will occupy three FIFO slots (k=3), while the compressed packet will occupy two slots (j=2). Other compression ratios may also be implemented in a similar manner.

It will further be recognized that when an uncompressed packet that is stored using k slots when it is originally enqueued in the transmit queue is replaced by a compressed packet occupying j slots, the remaining k−j entries will contain invalid data. Accordingly, in one embodiment these entries/slots are marked invalid such that they are not counted when determining the TT level and are skipped by the transmit queue Head pointer.

Figure 3C:
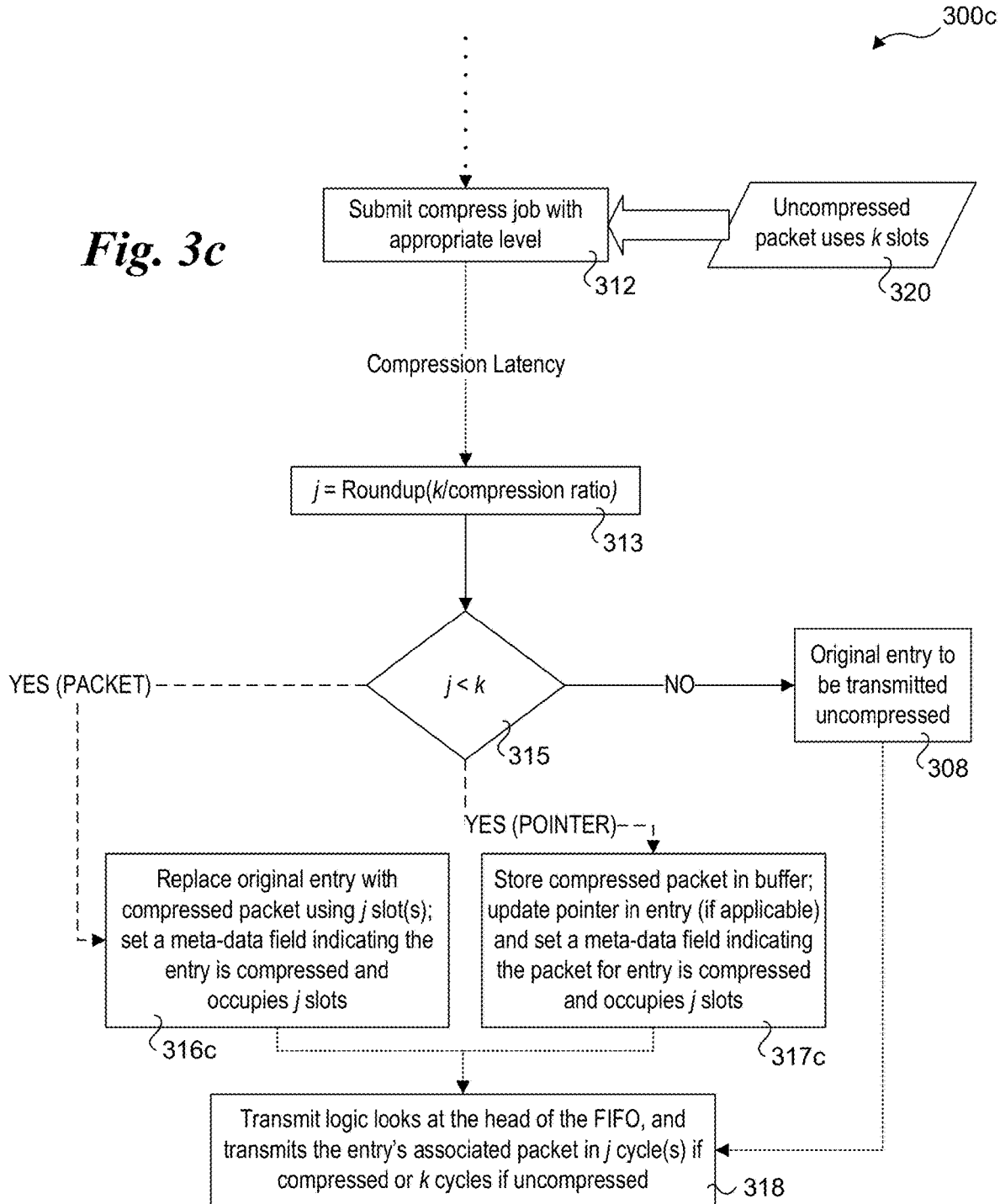
FIG. 3c is a flowchart illustrating an augmentation to the flowchart of FIG. 3a using an alternative scheme under which multiple levels of compression are supported and packets and queued and transmitted using a number of transmit cycles that are a function of the compression ratios of the packets.

Examples of multiple level compression schemes are shown in flowchart 300c and 300d of FIGS. 3c and 3d, which show alternative implementations of the operations and logic used by flowcharts 300a and 300b of FIGS. 3a and 3b, respectively. For simplicity, flowcharts 300c and 300d show the operations beginning in block 312; it will be understood that the other operations would be similar to those shown in flowcharts 300a and 300b, as discussed above.

As illustrated in each of flowcharts 300c and 300d, a data input 320 identifying the number of slots k used to store compressed packets is provided to block 312 (or alternatively could be provided to block 313). In block 313 a calculation of j is made based on the actual compression ratio obtained by compressing the packet. The equation is, $$j = \text{Roundup}(k/\text{compression ratio}) \tag{1}$$

wherein Roundup is used to round up the result of k divided by the actual compression ratio to the next integer (if k/compression ratio is not an integer). For example, suppose that k=3, and a variable compression scheme supporting 3:2 and 3:1 compression ratio thresholds are to be supported. Under this scheme, if the actual compression ratio is greater than 3:1, k/compression ratio will be less than 1, and equation (1) will return j=1. If the compression ratio is between 3:2 and 3:1, j=2. For an actual compression less than 3:2, j=3. The scheme can be extended in a similar manner as a function of k. For example, the applicable compression ration thresholds for k=4 would be 4:3, 2:1, and 4:1. Returning to flowchart 300c, in a decision block 315 a determination is made to whether j less than k. If it is, and packets are stored in the entries, the logic proceeds to a block 316c in which the original entry is replaced with the compressed entry using j slots, and the meta-data field is set to indicate the entry is compressed and occupies j slots. Generally, the number of slots j may be coded using an augmented binary scheme (for efficiency) to from which both the number of slots used and whether the entry is compressed or not can be determined. In one embodiment, the number of slots is simply encoded as a binary value using two or more bits (as needed). In one embodiment, the meta-data can be coded such that the actual number of slots j is offset from or a corresponding function of a corresponding binary value, since the value '00' in binary would have no corresponding number of slots (i.e., you can't have zero slots). Thus, a variable compression scheme that could use 1, 2, 3 or 4 transmission cycles to send a packet could be encoded using 2 bits rather than 3.

Figure 4:
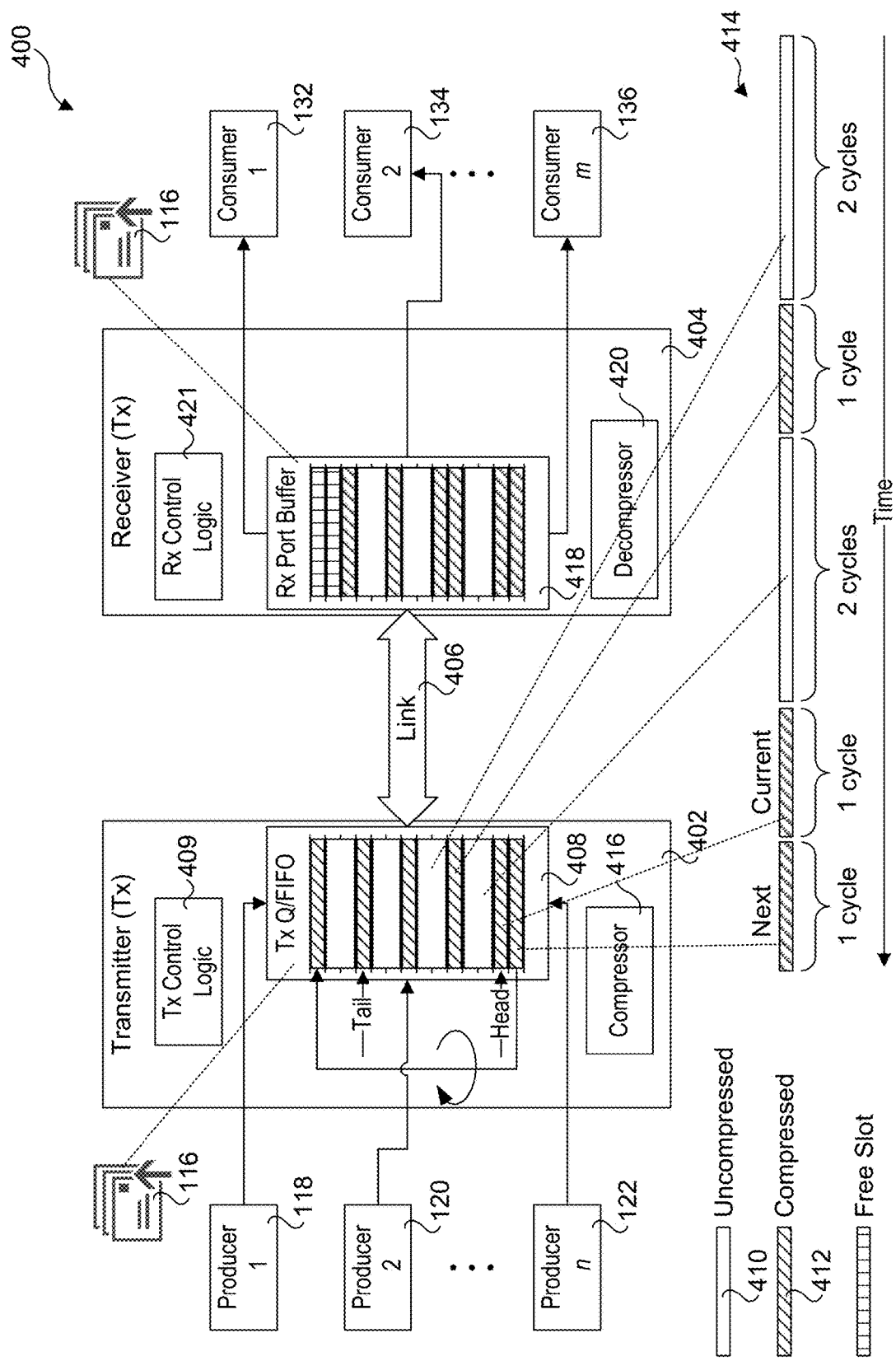
FIG. 4 illustrates a first link architecture supporting low-latency link compression under which packets or messages are enqueued in a transmit queue and the link is a serial link, accordingly to one embodiment.

If the answer to decision block 315 is YES and a pointer scheme is being used, the logic proceeds to a block 317c and the compressed packet is stored in a buffer, the pointer is updated (if applicable), and the meta-data field is set to with indicia that identifies the packet is compressed and the number of slot j used to store the packet. If the answer to decision block 315 is NO, the original entry will be transmitted uncompressed, as depicted by block 308. The logic from each of blocks 316c, 317c, and 308 proceeds to block 318, which operates in the similar manner to that described above for flowcharts 300a and 300b. Flowchart 300d of FIG. 4 shows similar operations for an embodiment under which compression is performed prior to enqueuing the associated entries in the transmit queue. In this case, if the answer to decision block 315 is YES, the entry associated with the compressed packet is enqueued using either j slots or a single slot for a pointer, and the meta-data field is set to identify the packet is compressed and the number of slots used to store the packet. If the answer to decision block 315 is YES, the logic proceeds to a block 316d in which an entry associated with uncompressed packet is enqueued using j slots or pointer using a single slot, and the meta-data field is set indicating the entry is compressed and the number of slots j used to store the packet. If the answer to decision block 315 is NO, the logic proceeds to block 309d in which an entry associated with uncompressed packet is enqueued using k slots or pointer using a single slot, and the meta-data field is set indicating the entry is uncompressed. Optionally, the meta-data field may be set to identify the number of slots used to store the uncompressed packet. For example, if the number of slots used to store the packet is 3, under a two-bit meta-data field the value could be set to either '00' or '11', wherein the former indicates the packet is uncompressed and since the number of slots use to store uncompressed packets is already known, there is no need to encode it separately. As before, the logic proceeds from each of block 316d and 309d to block 318 in which the entries associated packet is transmitted using j transmit cycles of compressed or k transmit cycles of uncompressed.

FIG. 4 shows a link architecture 400 illustrated one embodiment of a dynamic 2:1 link compression scheme. Link architecture 400 includes a transmitter 402 coupled to a receiver 404 via a link 406. Transmitter 402 includes a Tx queue/FIFO 408, Tx control logic 409, and a compressor 416. Tx queue/FIFO 408 is used to temporarily store packets 116, wherein the packets are stored in an original uncompressed format 410 or a compressed format 412 and each packet is associated with a respective entry in the queue. In one non-limiting embodiment, each of packets 116 has an original size of 64 Bytes, and a size of 32 Bytes when compressed. In the illustrated embodiment, each FIFO slot includes 32 Bytes for storing packet data such that a compressed packet occupies a single FIFO slot, while an uncompressed packet (64 Bytes) occupies two sequential FIFO slots. Under link architecture 400, each packet has an original fixed size of 64 Bytes. Each slot may also include additional storage for meta-data or the like.

In the embodiments illustrated herein, Tx queue/FIFO 408 is a circular FIFO that includes a Head pointer and a Tail pointer. Entries are added to the FIFO at the FIFO slot pointed to be the Tail pointer, while entries at the FIFO slot pointed to by the Head pointer are read out to be added to a transmit sequence 414. In one embodiment, packets that are to be compressed are compressed using a compressor 416 prior to be inserted into Tx queue/FIFO 408. Under an alternate approach, original packets (to be compressed) are added to a sequential pair of slots in Tx queue/FIFO 408, the packet data is read out by compressor 416 and compressed, and the written back into a single slot in Tx queue/FIFO 408. Under this approach it is optional whether to adjust the FIFO slots to pick up the "slack" that may occur when an original packet occupying two FIFO slots is written back to a single slot, or mark the (now) unused slot as invalid.

As illustrated, the compressed and uncompressed packets are read out of Tx queue/FIFO 408 in FIFO slot order and added to transmit bitstream 414, wherein the data corresponding to an uncompressed packet is transferred over 2 cycles, while compressed packets are transferred over a single cycle.

At receiver 404 the packets are received at a receive port and buffered in an Rx port buffer 418. Compressed packets are then decompressed using a decompressor 420. Generally, the decompressed packets may be decompressed "in place" (i.e., written back to Rx port buffer 418 after decompression), or under a first delayed decompression scheme they may be read out of Rx port buffer 418, decompressed by decompressor 420, and forwarded to an applicable consumer or buffered in a separate buffer. Alternatively, under another delayed decompression scheme, compressed and uncompressed packets are forwarded to a decompressor that is external to the receiver. (For further details, see the discussion of these delayed decompression schemes below.)

Under various embodiments, receiver 404 may include a packet classifier or other logic (collectively depicted as Rx control logic 421) to determine the intended recipient (e.g., consumer 1, 2, . . . m), for the packets, or the determination of the applicable consumer may be effected by other means. For example, as described below, in some embodiments link 404 is a socket-to-socket link that couples a pair of processors implementing ring interconnect architectures that include a scheme for distributing packets to intended recipients.

Generally, information concerning the compression of packets may or may not be implemented, depending on the compression scheme and the type of data sent over the link. For example, under some embodiments multiple levels of compressors are used on the transmit side, while at the receiver only a single compressor is use since there is adequate information in the compressed packet data that is received at the receiver to decompress the data. In some embodiments information concerning a type and/or level of compression may be included in some of the compressed and uncompressed packet data. For example, in some embodiments meta-data relating to compression information is included in packet or message header information.

Figure 4A:
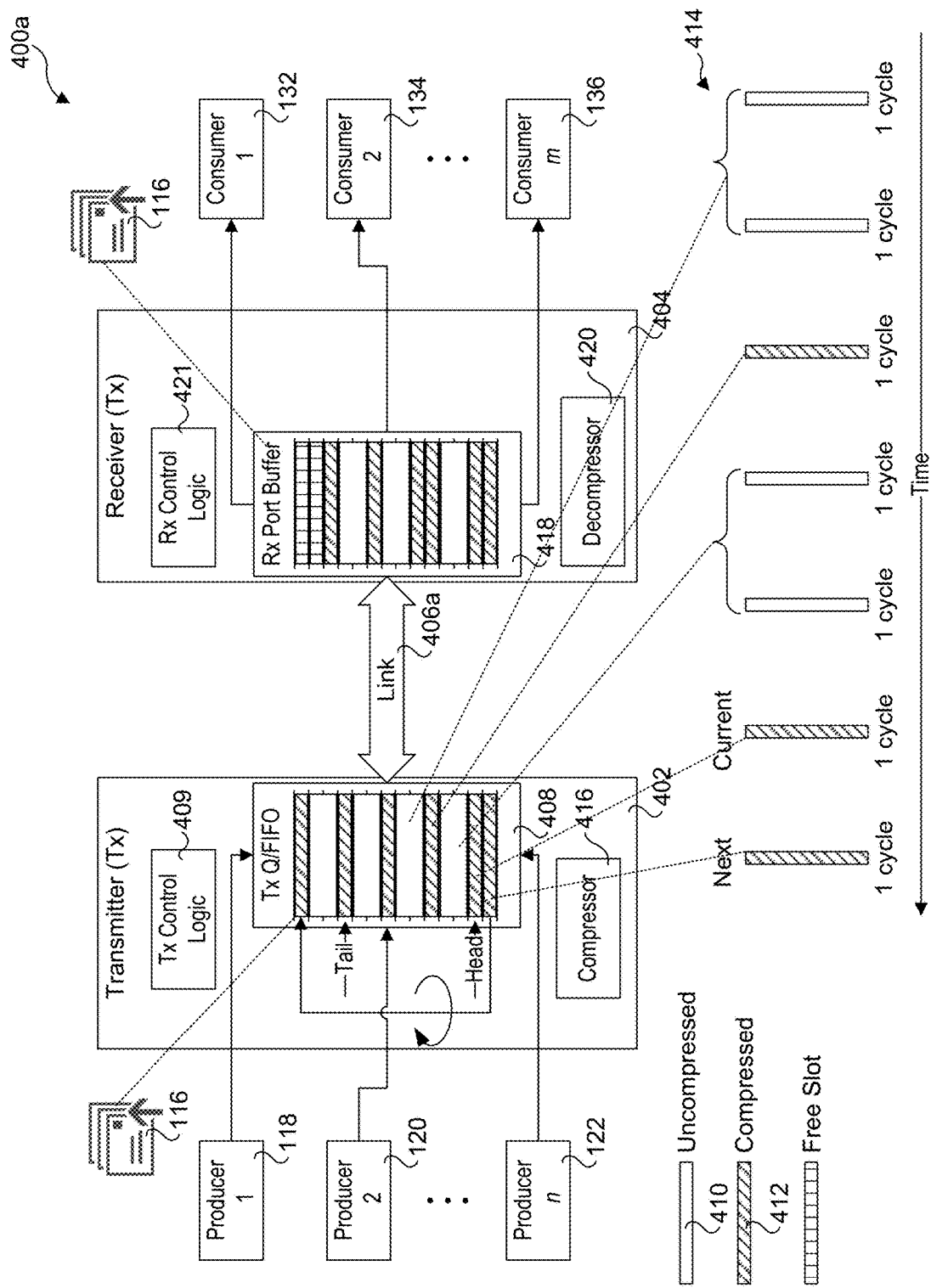
FIG. 4a illustrates an alternative implementation of the link architecture of FIG. 4, wherein the link is a bus-type link, accordingly to one embodiment.

Under link architecture 400, link 406 is a serial link comprising one or more lanes. Optionally, data can be transmitted using a bus-type link, wherein data is transmitted in parallel during the cycle. As example of link architecture 400a employing a bus-type link 406a is shown in FIG. 4a. In this example, both the FIFO slots and the bus are 32 Bytes wide, or otherwise have the same width. Accordingly, uncompressed packets are transmitted over link 406a using two bus cycles, while compressed packets are transmitted over one bus cycle.

Figure 4B:
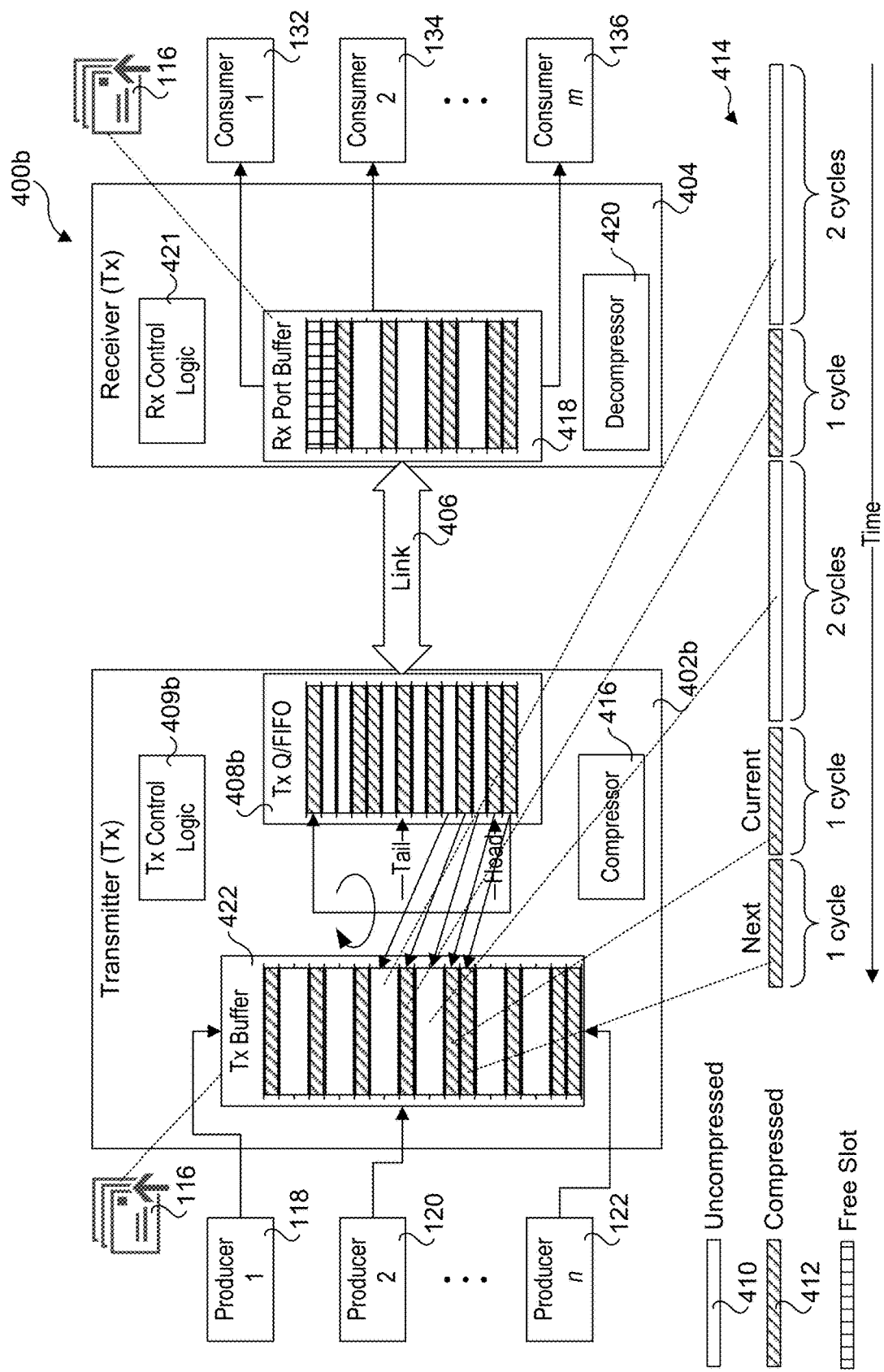
FIG. 4b illustrates a second link architecture supporting low-latency link compression under which pointers to packets or messages are enqueued in a transmit queue rather than the packets or messages themselves, accordingly to one embodiment.

As discussed above, a Tx queue/FIFO can be used to store pointer to packets/messages (and related metadata) rather than store the packets/messages themselves. Link architecture 400b of FIG. 4b illustrates an example of a dynamic compression scheme implementing this approach using a transmitter 402b including Tx control logic 409b. The packets 116 generated by consumers 1, 2, . . . n are written to a Tx buffer 422. For simplicity, Tx buffer 422 is shown as a single buffer; it will be recognized that one or more Tx buffers may be used, such as a respective Tx buffer per producer in a manner similar to that shown in FIG. 1. Tx queue/FIFO stores pointers to the packets in Tx buffer 422, along with meta-data indicating whether the packet associated with the FIFO entry is compressed, optionally identifying a level of compression used if the dynamic compression scheme is to support multiple levels of compression. In connection with processing of a given packet, such as in accordance with aspects of flowcharts 300a and 300b, some packets will be compressed, while others will remain uncompressed. In the example of FIG. 4b, the packet data would be read by compressor 416, compressed, and written to Tx buffer 422. It is noted that another level of Tx buffers that are not shown may be used to buffer packets prior to compression, or the packets may be (effectively) compressed in place (e.g., the compressed packet data is written back to the same location containing the uncompressed packet).

When the FIFO entries of Tx queue/FIFO are processed, the packet data identified by the pointer in the FIFO entry currently pointed to be the Head pointer will be read out to be added to the transmit sequence 414 comprising a bitstream when link 406 is a serial link. If link 406 is a bus, the packet data will be transferred in a manner similar to that shown in FIG. 4a.

Note that the 2:1 dynamic compression schemes illustrated in FIGS. 4, 4a, and 4b are merely an example of a particular compression ratio and are not to be limiting. This approach may be extended to other schemes in a natural manner, say for a scenario where the data packet size to bus width or packet size to serial link transfer size (per cycle) is 3:1. Then the compressor will see if it can reduce the data by ⅓rd or ⅔rd. In these cases, it can represent the data as 2 compressed units or 1 compressed unit. The meta-data will store the fact that it's compressed, but also the additional information on how many cycles worth of packet data need to be transmitted (for a given packet). The transmit logic will check if the entry is compressed, and then accordingly send 1 or 2 compressed packets, else 3 packets as with the normal uncompressed data.

Under another approach, compressed packet data is stored in a separate compressed FIFO (cFIFO) (with meta-data indicating which entry in the original FIFO it refers to) that holds compressed data. The transmit logic looks at the head of the original FIFO and the cFIFO and picks the compressed entry where possible.

Figure 4C:
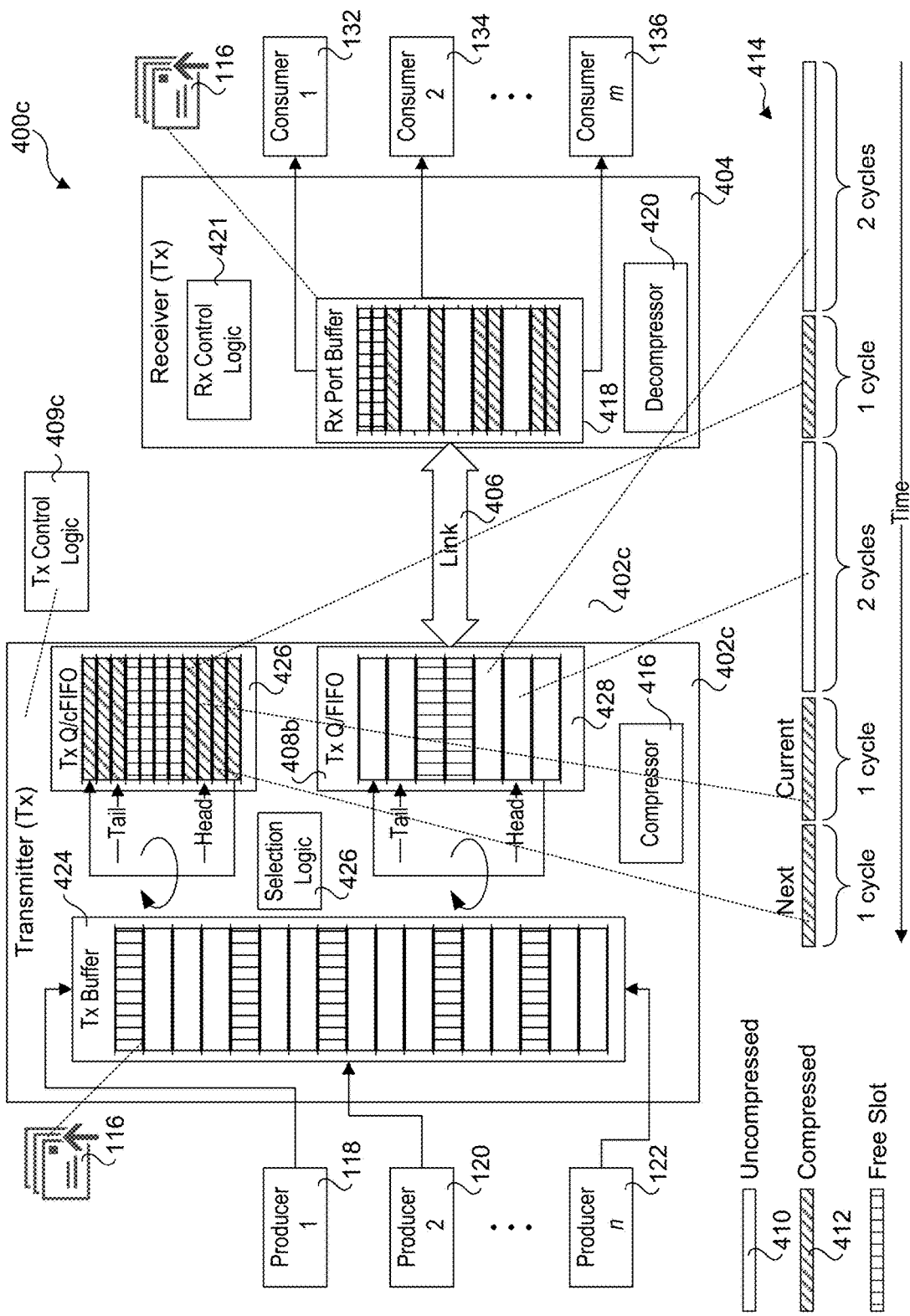
FIG. 4c illustrates a third link architecture supporting low-latency link compression under which separate transmit queues are used to queue compressed packets or messages and uncompressed packets or messages, accordingly to one embodiment.

Link architecture 400c of FIG. 4 illustrates an example of this approach. Transmitter 402c now includes Tx buffer 424, a Tx queue/cFIFO 426, a Tx queue/FIFO 428, Tx control logic 409c and selection logic 426. In a manner similar to that discussed above, producers 1, 2, . . . n generate packets 116 that are buffered in Tx buffer 424. Generally, Tx buffer 424 may be implemented as an unordered buffer or as a FIFO. In the example illustrated in FIG. 4c, Tx buffer has multiple 64 Byte slots, and the size of each (uncompressed) packet is 64 Bytes.

Selection logic 426 includes logic for selecting which packets are to be compressed, and for selecting which of Tx queue/cFIFO 426 and Tx queue/FIFO 428 to read out the next packet data to be added to transmit sequence 414. When a packet is compressed, the uncompressed packet data is read from Tx buffer 424 by compressor 416, which compresses the packet data and writes the compressed packet data to the FIFO slot currently pointed to by the Tail pointer for Tx queue/cFIFO 426. For packets that are not to be compressed, the packet data is read from Tx buffer 424 and written to the FIFO slot currently pointed to by the Tail pointer for Tx queue/FIFO 428.

In addition to the illustrated embodiments, aspects of the embodiments may be combined to implement other embodiments that are not illustrated herein. For example, rather than copying uncompressed packet data to Tx queue/FIFO 428, this Tx queue/FIFO may store pointers to the packet data in Tx buffer 424, and the packet data is read out from Tx buffer 424 when it is added to transmit sequence 414.

Figure 5:
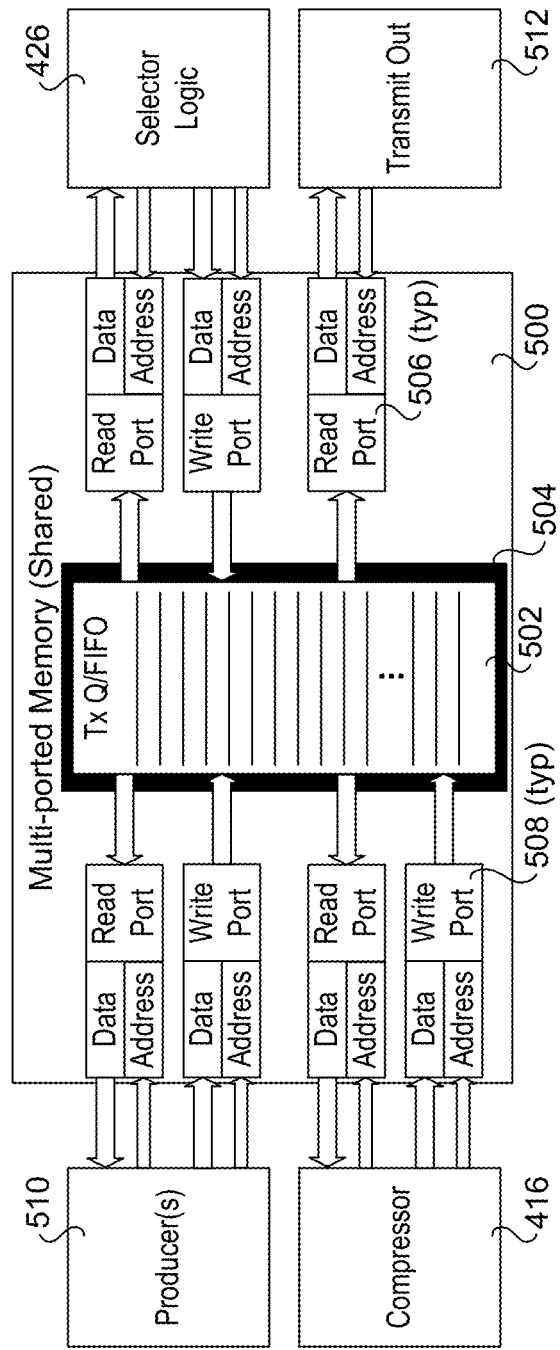
FIG. 5 is a schematic block diagram of an exemplary multi-ported memory suitable for use in the transmit queues disclosed herein.

In some embodiments, it will be advantageous to provided concurrent access to a Tx queue/FIFO. An embodiment of a multi-ported memory 500 configured to support concurrent read and write access to a Tx queue/FIFO 502 is shown in FIG. 5. Multi-ported memory 500 includes a memory region 504 having an address space in which Tx queue/FIFO 502 is implemented. In one embodiment the address space is partitioned in accordance with the transmission scheme, such that each address is associated with a portion of memory region 504 having the same size as the amount of data that is transmitted each cycle. For example, in one embodiment, the address space is partitioned into 32 Byte cachelines (aka memory lines) or the like for a scheme that transmits 32 Bytes per cycle.

As further illustrated, multi-ported memory 500 includes multiple read ports 506 and write ports 508. Various components are provided access to multi-ported memory 500 via the read and write ports; for example, in the illustrated embodiment these include one or more producers 510, a compressor 416, selector logic 426, and a transmit out block 512. These are merely some non-limiting examples of components and/or logic blocks that may access multi-ported memory 500. In some embodiments, each producer may have is own read/write access to a multi-ported memory, or otherwise there may be more than one read/write port to be used by multiple producers. In addition, in some buffer/queue hierarchies, an agent or the like may be used to copy data from a buffer in one level in the hierarchy to a queue in another layer in the hierarchy.

A Tx queue/FIFO may be implemented using conventional techniques for implementing queues and FIFOs that are well-known in the art. For example, embedded logic or the like, may be used to effect enqueue and dequeuer operations, such as managing the head and tail pointers and associated writes (enqueuing) and reads (dequeuing) of the entries in the FIFO Such embedded logic may be in the form of an embedded processor or microcontroller configured to execute instructions, fixed or programmable logic circuitry, such as an FPGA (Field Programmable Gate Array) or ASIC (Application Specific Integrated Circuit), or any combination of hardware and software/firmware used to effect queue and FIFO operations. More generally, embedded logic for controlling the operation of Tx queue/FIFO, as well as other transmitter operations are collectively depicted as Tx control logic 409.

In addition to conventional queue/FIFO operations, more advanced operations may also be implemented, such as skipping multiple entries during a given de-queuing cycle. Also, a scheme may be implemented including separate sets of Head and Tail pointers for compressed and uncompressed packets within a single queue/FIFO. This would be similar to the architecture shown in FIG. 4c, except a single queue/FIFO would be used in which both compressed and original (uncompressed) packets would be enqueued and dequeued, wherein one set of Head and Tail pointers would be used for the compressed packets, while a second set of Head and Tail pointers would be used for the uncompressed packets.

In addition to the logic shown in flowcharts 300a and 300b, another extension of the threshold concept is to have a second larger threshold, and then start to compress an entry beyond the first threshold when entries have queued up beyond a larger second threshold. The concept here is that compressing the current entry is primarily to help later arriving entries.

Receive-Side Compressibility Indication

An additional feature of the system is that the receiver can communicate back to the transmitter an indication of where congestion is occurring. If the congestion is further downstream from where the receiving logic will decompress received packets, then there is no gain from compressing the data and the compressor will be disabled (even though the transmit FIFO has entries greater than the threshold). The exact nature of this communication will depend on the link and protocol, and available bits to convey such information. This may be a simple as sending a single-bit from the receiver saying whether it thinks compressing can be beneficial at that moment, to sending similar indicia using a control packet or message, wherein the control packet or message may be used to convey additional information, such as a number of credits for a given flow.

Choosing the Level of Compression

A compression level indicates how much effort/time is spent trying to compress the data. Often, when we spend more effort, it results in a smaller compressed data size. A simple scheme can just pick a fixed level of compression, and a fixed latency such as 2 cycles. However, we propose an extension where the level is adjusted on a per-entry basis as follows. Say we have three levels of compression which have a latency of {2, 3, 4} cycles. In general, the decompression latency will be fixed for all of these levels. For the entry that's just above the threshold, we can submit a compression job with level-1 (i.e. 2-cycle latency). However, the next entry can be submitted as a level-2 job and the next one as a level-3 job. This will depend on how many parallel compression units there are in the implementation, and the available levels/latencies.

Compression and Problems with Data Bursts

While the foregoing embodiments enable higher throughput than available via nominal (uncompressed) link bandwidths, the use of compression of cacheline data present potential problems relating to data bursts on the receive side. As used herein, a data burst results in a sequence of packets being transmitted over an interconnect with no idle time between packets such that the full bandwidth of the link (also referred to as the full line rate of the link) is utilized throughout the data burst. For example, consider an on-chip mesh interconnect as an example to illustrate problems with data bursts as a result of decompression. Mesh performance is a critical factor in overall performance of modern multi-core System on a Chip (SoC) processors, such as multi-core processor using Intel® architectures (IA) and ARM®-based architectures. Busses, rings, and switches can't scale to the core counts seen today. A rule of thumb is that once an interconnect becomes a workload bottleneck, any improvement in interconnect performance correlates 1:1 with an overall performance improvement. Mesh scaling has now reached a point where it is very difficult and expensive to physically scale wires or frequency to keep up with core counts. To address this, the embodiments disclosed herein provide additional scaling at low cost using compression, as presented above.

Today's processor include support for coherent memory domains using multiple cache layers and messaging sent between cache agents. In addition to data transfers, this involves a significant level of snooping messages. In many of today's processors, the associated coherent mesh traffic (e.g., data transfers and messages sent over various interconnects in the SoC) consists of 64 B cache lines sent uncompressed as two 32 B packets, one per cycle. Under exemplary implementations of the embodiments describe above, the data in the cache lines may be selectively compressed depending on data compressibility and sent as either one compressed 32 B packets or two uncompressed 32 B packets.

When data arrives at an agent (is egressed from the mesh) it is typically stored as two entries in a 32 B wide buffer until it can be consumed. The buffer write bandwidth is rate matched to the mesh (32 B per cycle). With compressed traffic, the buffer may now receive 32 B of compressed data per cycle. If the data were to be decompressed before writing it to the buffer, the buffer write bandwidth would need to be doubled to match the line rate of the interconnect.

Figure 6A:
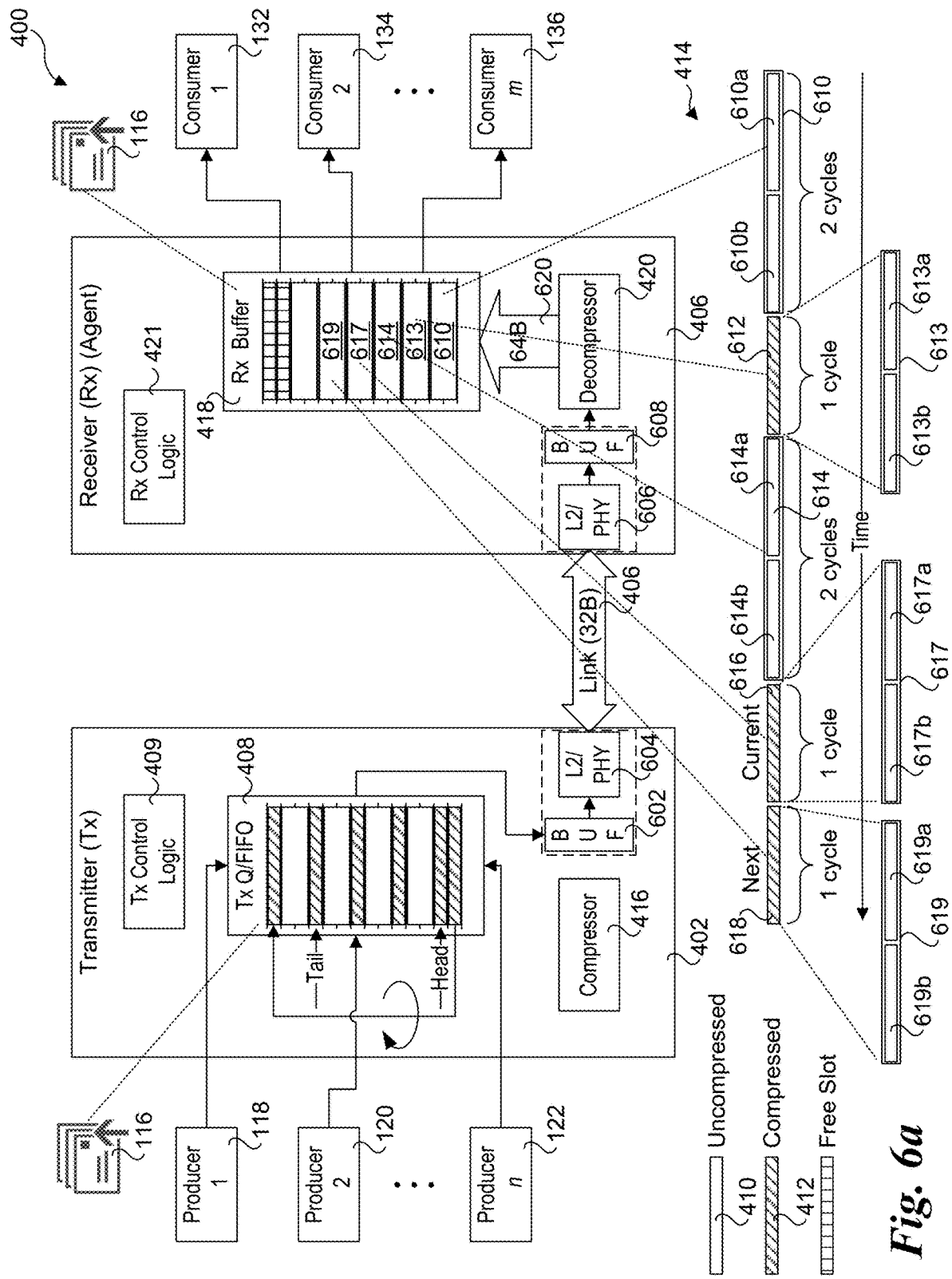
FIGS. 6a and 6b are architecture and flow diagrams illustrating implementation of a scheme that performs decompression of packets as compressed packets are received at a receiver in a manner that requires used of a 64 Byte write datapath.
Figure 6B:
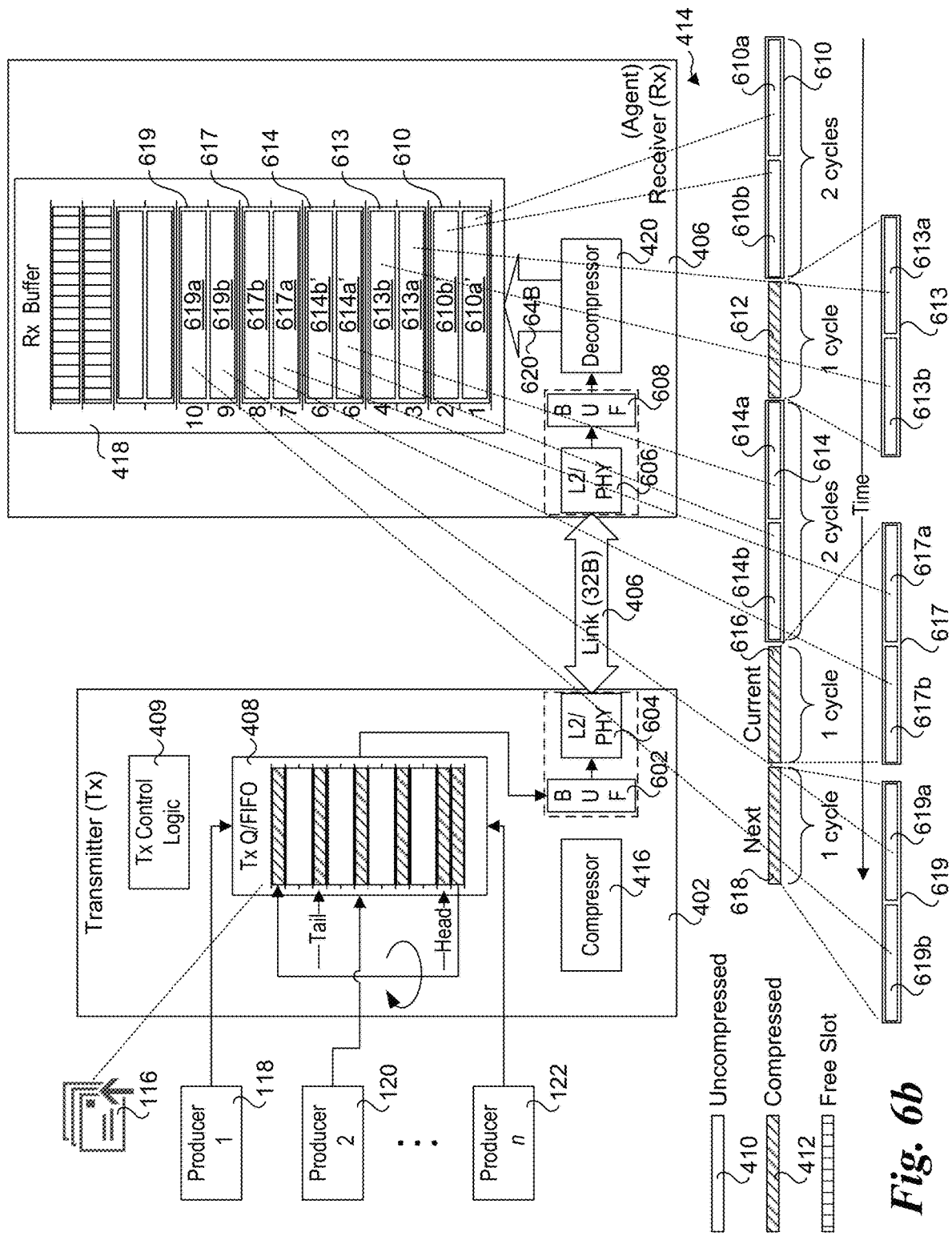

An example of this situation is illustrated in FIGS. 6a and 6b, which show further details of link architecture 400 of FIG. 4 discussed above. In FIGS. 6a and 6b, transmitter 402 is further depicted as including an egress buffer 602 and a Layer 2 and Physical Layer (L2/PHY) block 604. Meanwhile, receiver 406, which may also function as an agent, is depicted to further include an L2/PHY block 606 and an ingress buffer 608. Alternatively, the PHY and L2 functions on both the transmitter and receiver may be implemented using separate PHY and L2 blocks. In addition, ingress buffer 608 may be included as part of an L2/PHY block or otherwise may be used by the L2/PHY block during L2 and/or PHY processing of received data, as depicted by the dashed box encompassing L2/PHY block 606 and ingress buffer 608. Similarly, egress buffer 602 may be included as part of an L2/PHY block or otherwise may be used by the L2/PHY block during L2 and/or PHY processing of transmitted data, as depicted by the dashed box encompassing L2/PHY block 604 and egress buffer 602.

As described above, in some embodiments transmit sequence 414 transmits uncompressed cacheline data using two packets in two cycles, and compressed cacheline data using a single packet in a single cycle. In the context of coherent mesh traffic, the data for a 64 B cacheline is sent as two 32 B packets over two cycles or a single 32 B packet containing compressed cacheline data (when using a 2:1 compression ratio threshold). In FIGS. 6a and 6b, transmit sequence 414 has been augmented to further illustrate a transmission sequence of packets 610a, 610b, 612, 614a, 614b, 616, and 618. Packets 610a and 610b are uncompressed 32 B packets conveying data corresponding to 64 B cacheline 610. Similarly, packets 614a and 614b are uncompressed 32 B packets conveying data corresponding to 64 B cacheline 614. Each of packets 612, 616, and 618 are 32 B packets respectively conveying compressed 64 B cachelines 613, 617, and 619.

Upon receipt of packets 610a, 610b, 612, 614a, 614b, 616, and 618 at receiver 406, they are buffered in ingress buffer 608 (in connection with PHY and L2 layer processing by L2/PHY block 606), decompressed by decompressor 420 and written to Rx buffer 418, which is a 32 B wide buffer with multiple 32 B slots. As shown in FIG. 6b, packets 610a and 610b respectively include uncompressed cacheline data 610a' and 610b' that is written to first and second slots in Rx buffer 418 without decompression (or otherwise packets 610a and 610b are written to the first and second slots). Similarly, packets 614a and 614b respectively include uncompressed cacheline data 614a' and 614b' that is written to fifth and sixth slots in Rx buffer 418 without decompression (or otherwise packets 614a and 614b are written to the fifth and sixth slots).

Each of packets 612, 616, and 618 contain compressed 64 B cacheline data. Accordingly, compressed cacheline 613 data in packet 612 is decompressed by decompressor 420 and written as cacheline data 613a and 613b to the third and fourth slots of Rx buffer 418, compressed cacheline 617 data in packet 616 is decompressed by decompressor 420 and written as cacheline data 617a and 617b to the seventh and eighth slots of Rx buffer 418, and compressed cacheline 619 data in packet 618 is decompressed by decompressor 420 and written as cacheline data 619a and 619b to the ninth and tenth slots of Rx buffer 418.

In order for the schemes illustrated and FIGS. 6a and 6b to support data bursts over link 406, there needs to be some means to enable the decompression operations while maintaining the link bandwidth. One way to address this is to double the write bandwidth of Rx buffer 418 such that decompressor 420 can write two 32 B portions of a 64 B cacheline within a single cycle, as depicted by a 64 B datapath 620. In some cases expanding the write throughput of buffers and/or datapaths to support burst throughput may be very expensive in terms of increased design complexity and area. In addition, this may not be practical/possible at higher link bandwidths, which are already pushing the bandwidth limits achievable today.

Delayed Link Compression

In accordance with aspects of the embodiments now described, delayed link decompression schemes and related techniques are disclosed that facilitate higher throughput using link compression without having to add additional buffers and/or increase datapath widths. Under one aspect, compressed data that is received over a link is stored in an Rx buffer without decompression and subsequently decompressed as late as possible along a forwarding path to the destination of a consumer of the data. In some cases this may be when data is read from the buffer. In other cases data may stay compressed until it reaches the data consumer, such as a computation engine, which can consume and benefit from the higher bandwidth.

FIG. 7a illustrates an abstracted view of a first delayed decompression scheme under which decompression is delayed until cacheline data is read from the Rx buffer. FIG. 7a depicts an agent 700a that receives data from an interconnect 702 using a 32 B per cycle data transmission scheme 704 supporting compression. Under one implementation of the compression scheme, some packets will contained compressed data, while other packets may not, depending on whether a threshold compression ratio is met, such as 2:1 in an embodiment that transmits 64 B cacheline data. As the packets are received, the packet data contained in the packets is written to Rx buffer 706 in its received form, whether the packet data is compressed or uncompressed. As the packet data is read from Rx buffer 706, it is decompressed by a decompressor 710, which is coupled to Rx buffer 706 with a 32 B datapath 708. For compressed data that is stored in Rx buffer, this results in producing two 32 B portions of data for each 64 B cacheline. For data that is received and stored as uncompressed data, decompressor 610 prepares the data for forwarding without decompressing it. The decompressed (and uncompressed) data is then forwarded to a computation block 614 via a 64 B datapath 712. Computation block 714, which is illustrative of a consumer of the data, generally may be a processing element, such as a processor core, or a cache level associated with the processing element, such as an L2 cache, or other type of processing element (e.g., an accelerator) as described in further detail below.

FIG. 7b illustrates an abstracted view of a second delayed decompression scheme under which decompression is delayed until cacheline data is forwarded to computation block 714. More generally, under this approach data is kept compressed until it is used to provide additional bandwidth and avoid expanding the internal datapath.

In a manner similar to that discussed above, in FIG. 7a, FIG. 7b depicts an agent 700b that receives data from an interconnect 702 using a 32 B per cycle data transmission scheme 704 supporting compression. The packet data for each packet is written to Rx buffer 706 as it is received in its received compressed or uncompressed form. When the cacheline data is accessed, it is forwarded over a 32 B datapath 716 to decompressor 710, which is located proximate to computation block 714. Upon receiving the data sent of 32 B datapath 716, decompressor 710 decompressed the data (if compressed), and then forwards the uncompressed data via a 64 B datapath to computation block 714.

Figure 8:
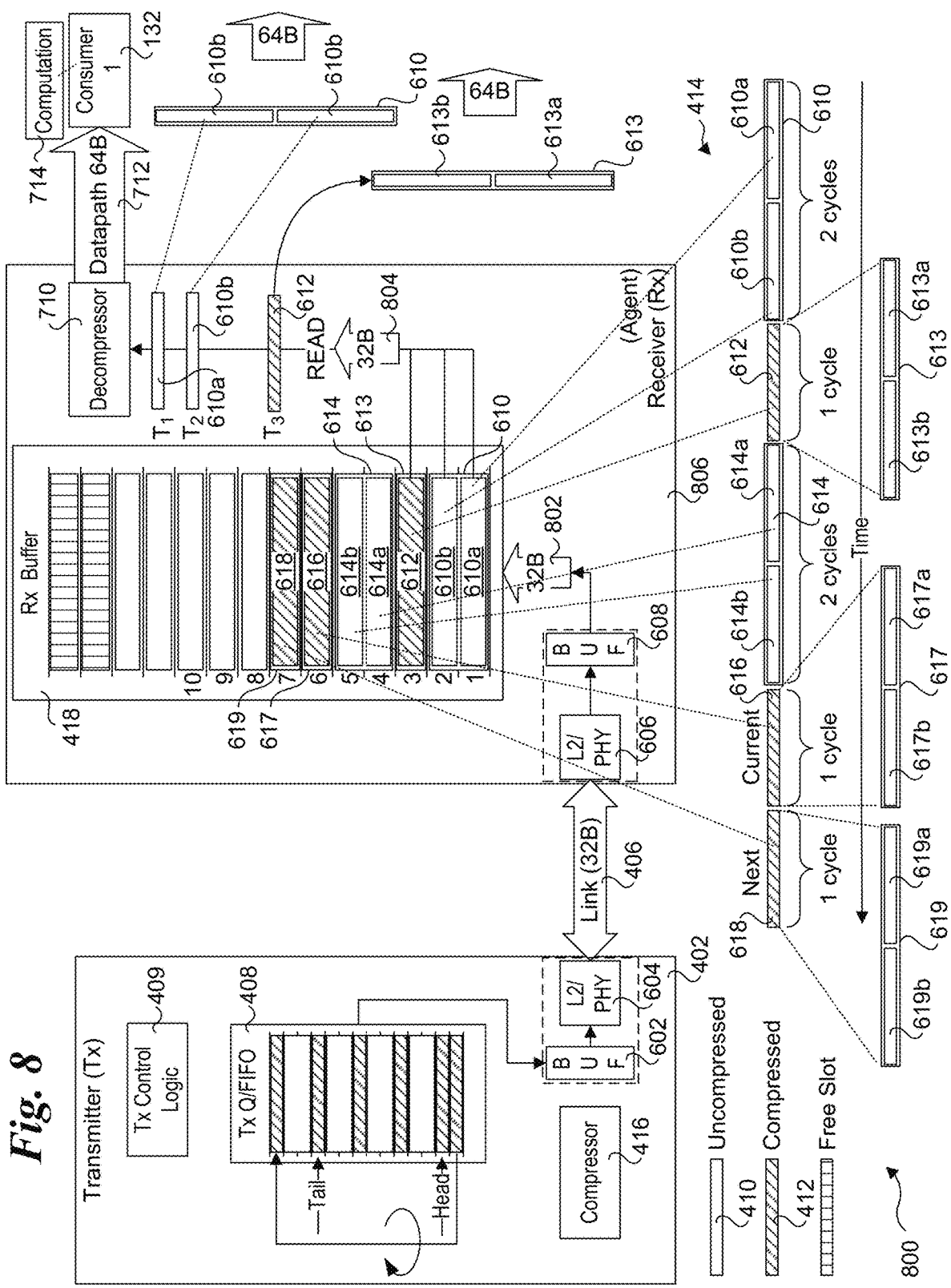
FIG. 8 is a schematic diagram illustrating a system architecture configured to implement aspects of the first delayed decompression scheme of FIG. 7a, according to one embodiment.

FIG. 8 shows a system architecture 800 configured to implement aspects of the first delayed decompression scheme of FIG. 7a, according to one embodiment. Generally, like numbered components in FIG. 8 and FIGS. 6a and 6b perform similar operations and/or represent similar data. As in FIGS. 6a and 6b, transmit sequence 414 includes a sequence of packets 610a, 610b, 612, 614a, 614b, 616, and 618. Packets 610a and 610b are uncompressed 32 B packets conveying data corresponding to 64 B cacheline 610, while, packets 614a and 614b are uncompressed 32 B packets conveying data corresponding to 64 B cacheline 614. Each of packets 612, 616, and 618 are 32 B packets respectively conveying compressed 64 B cachelines 613, 617, and 619.

As packets are received by receiver 806, they are buffered in ingress buffer 508 and written to Rx buffer 418 over a 32 B datapath 802 at line-rate speed (e.g., 32 B per cycle). As before, Rx buffer 418 includes multiple 32 B slots, including slots labeled 1-10. In one embodiment, the packets are written directly to slots in Rx buffer 418 without any modification, such that each received packet is written to a respective 32 B slot. As shown, the respective packets written to slots 1-7 are uncompressed packets 610 and 610b conveying data corresponding to cacheline 610, compressed packet 612 conveying data corresponding to 64 B cacheline 613, uncompressed packets 614a and 614b conveying data corresponding to cacheline 614, compressed packet 616 conveying data corresponding to 64 B cacheline 617, and compressed packet 618 conveying data corresponding to 64 B cacheline 619. Generally, various schemes may be used to indicate whether packets are compressed or not, such as using a compressed/decompressed flag bit stored with the packet or cacheline data itself, or using a bitmap in a separate buffer or implemented in circuitry indicating which slots in Rx buffer 418 contain compressed data.

As shown, at time $T_1$, cacheline data 610a is read from slot 1, followed by cacheline data 610b being read from slot 2 at time $T_2$. Generally, when a 64 B cacheline is stored as two sequential uncompressed 32 B portions, the reading of the second 32 B portion at $T_2$ will immediately follow reading the first 32 B portion at $T_1$ (e.g., $T_2$ will correspond to the next cycle following $T_1$). The respective 32 B portions of cacheline data corresponding to 32 B packets 610a and 610b are combined by decompressor 710 into a 64 B cacheline 610, which is then transmitted over 64 B datapath 712 to consumer 132 (Consumer 1). Upon receive, consumer 132 uses a computation block 714 to perform one or more computations with the received cacheline data.

Compressed packet data is processed in a somewhat different manner. As with uncompressed data, the data stored at a given 32 B slot (corresponding to a given 32 B packet) is read by decompressor 710, such as depicted by reading packet 612, which includes data corresponding to 64 B cacheline 613. Since packet 612 contains compressed data, it is decompressed by decompressor 710 to regenerate the original uncompressed 64 B cacheline, which is depicted as including 32 B portions 613a and 613b for illustrative purposes (for comparison to the decompression scheme shown in FIGS. 6a and 6b), but in practice the 32 B compressed data is simply decompressed to produce 64 B of data.

In the foregoing example, for illustrative purposes, the packets are written into the respective slots in a sequential order corresponding to the order in which they are received. However, this is not meant to be limiting, as in other embodiments a given packet may generally be written into an available slot in an Rx buffer. Additionally, for illustrative purposes, the cacheline data is processed in a FIFO order, although this is not meant to be limiting, as various schemes may be implemented for forwarding cacheline data that has been written to an Rx buffer in a different order from which the data is written. It is further noted that for illustrative purposes, the packets and their data received over link 406 are depicted has horizontal blocks in a manner similar to how transmission of a bitstream over a serial link would be depicted. However, this is also intended to represent transfer of data over a bus-type link, similar to illustrated in FIG. 4a above, since in some embodiments link 406 may be a bus-type link (such as a link that is 32 B wide, as discussed in further detail below).

Figure 9:
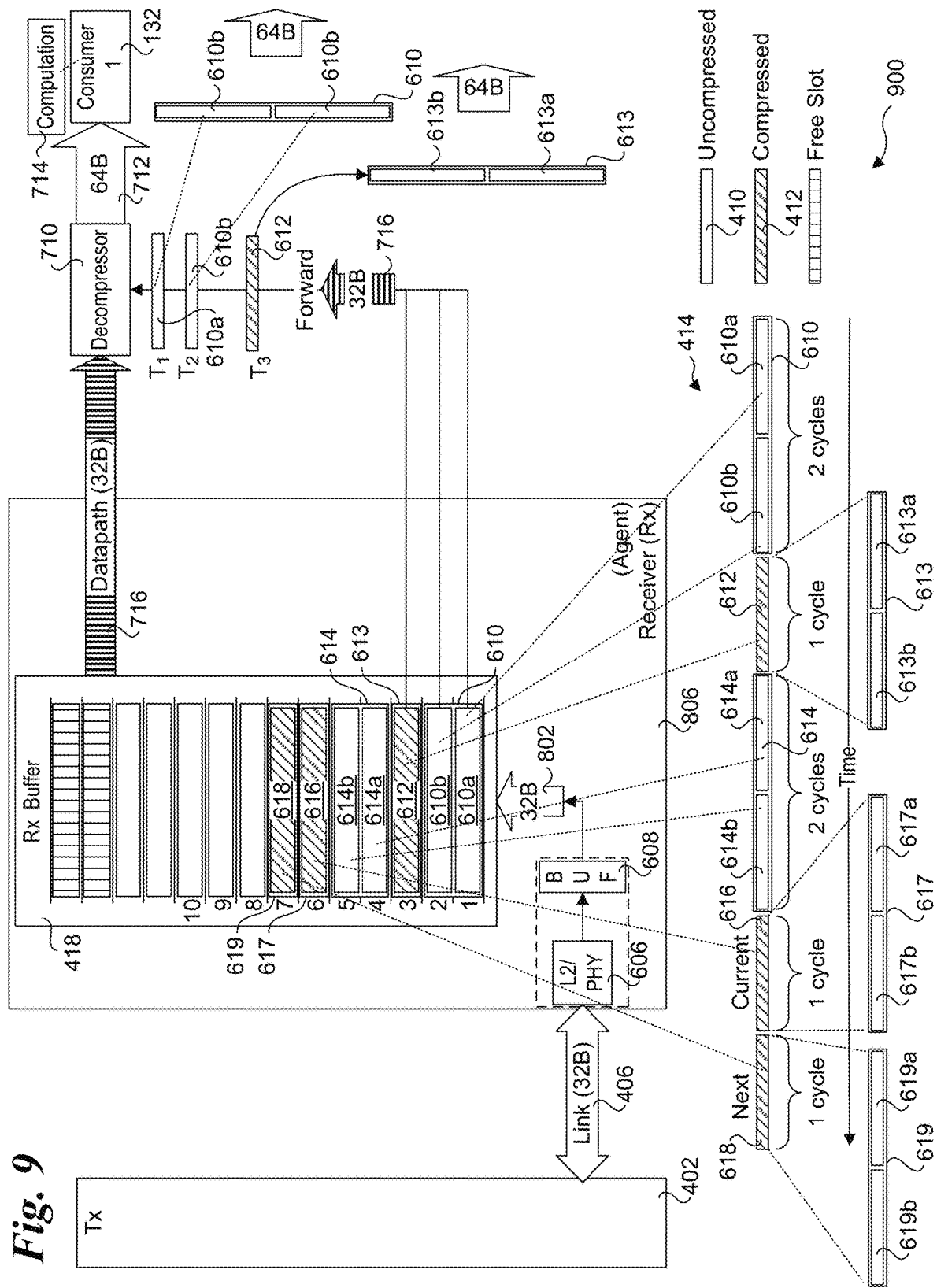
FIG. 9 is a schematic diagram illustrating a system architecture configured to implement aspects of the second delayed decompression scheme of FIG. 7b, according to one embodiment.

FIG. 9 shows a system architecture 900 configured to implement aspects of the second delayed decompression scheme of FIG. 7b, according to one embodiment. Generally, many of the operations and components shown in FIGS. 8 and 9 perform the same or similar operations, including how the received packets are processed and written to Rx buffer 408. Accordingly, the following discussion of FIG. 9 will focus on operations and structure relating forwarding of 64 B cacheline data from Rx buffer 418.

As discussed above with reference to FIG. 7b, under this delayed decompression scheme cacheline data stored in Rx buffer 418 is forwarded using 32 B datapath 716 to decompressor 710. FIG. 9 shows the forwarding of the first cacheline data stored in the first three slots (corresponding to packets 610a, 610b, and 612, respectively). Upon being received by decompressor 710, the 32 B portions of uncompressed cacheline data is combined into the corresponding 64 B cacheline and forwarded to consumer 132 via a 64 B datapath in a manner similar to that described above for the scheme illustrated in FIG. 8 (noting the 64 B datapath is shorter under the scheme in FIG. 9). Also, in a manner similar to FIG. 8, upon receipt of compressed cacheline data, the data is decompressed by decompressor 710 and forwarded via the 64 B datapath to consumer 132.

Example Use Context—Transfer of Cacheline Data within a Processor

In accordance with further aspects of some embodiments, the data compression and delayed decompression schemes may be implemented for transfer of cacheline data within a processor. Generally, the approaches described below may be implemented using various types of interconnect architectures, including ring-based interconnects, torus-based interconnects, and grid-based interconnects, as well as a combination of these interconnects.

Figure 10:
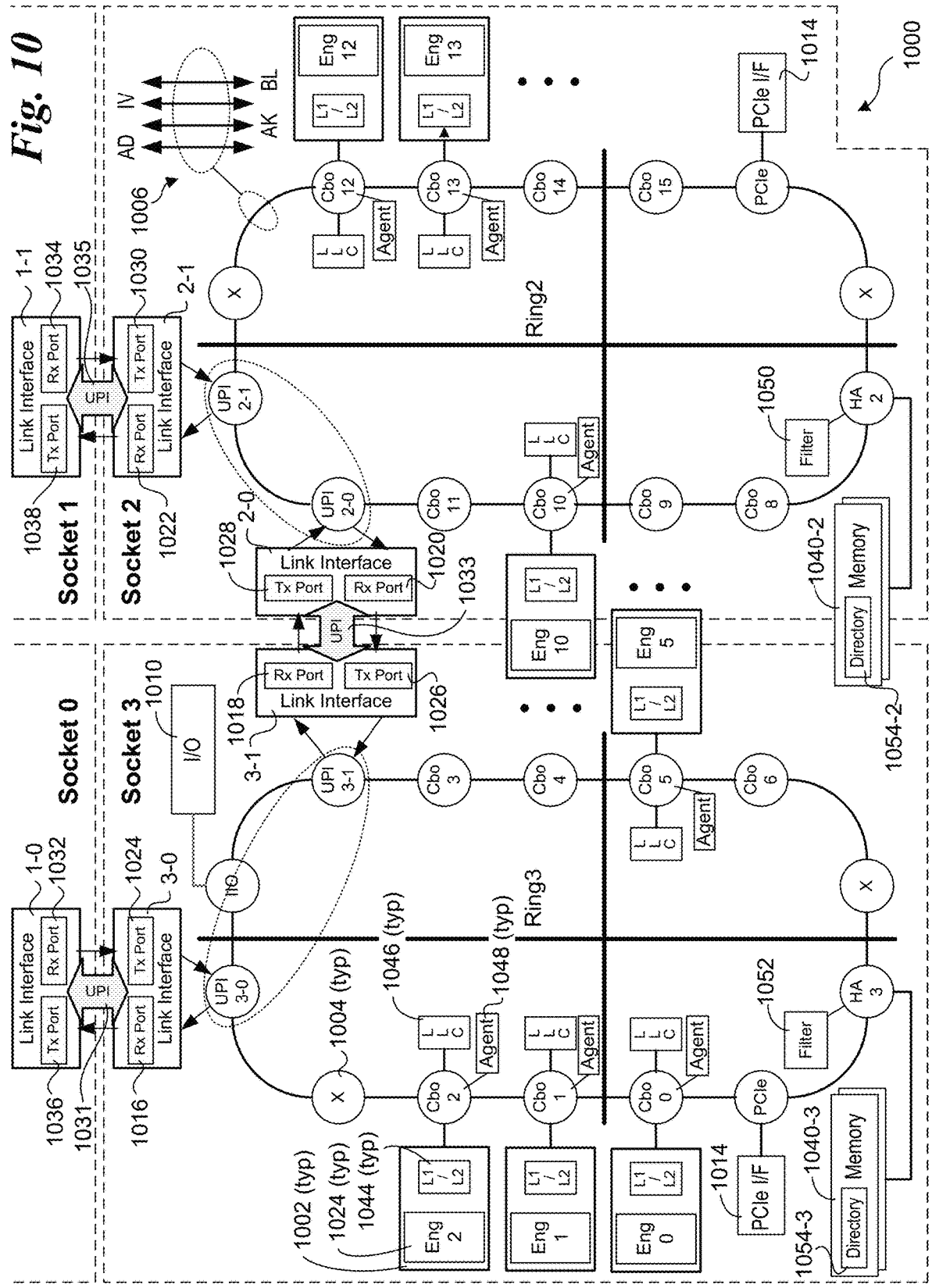
FIG. 10 is a multi-socket system architecture diagrams illustrating selected aspects of processors in a multi-socket system employing ring interconnects and including socket-to-socket link interfaces.

An example of a system architecture employing a ring interconnect architecture is shown in FIG. 10. System 1000 of FIG. 10 employs of a system architecture including System on a Chip (SoC) processors (CPU's) supporting multiple processor cores 1002, each coupled to a respective node 1004 on a ring interconnect, labeled and referred to herein as Ring2 and Ring3 (corresponding to CPU's installed in CPU sockets 2 and 3, respectfully). For simplicity, the nodes for each of the Ring3 and Ring2 interconnects are shown being connected with a single line. As shown in detail 1006, in one embodiment each of these ring interconnects include four separate sets of "wires" or electronic paths connecting each node, thus forming four rings for each of Ring2 and Ring3. In actual practice, there are multiple physical electronic paths corresponding to each wire that is illustrated. It will be understood by those skilled in the art that the use of a single line to show connections herein is for simplicity and clarity, as each particular connection may employ one or more electronic paths.

In the context of system 1000, a cache coherency scheme may be implemented by using independent message classes. Under one embodiment of a ring interconnect architecture, independent message classes may be implemented by employing respective wires for each message class. For example, in the aforementioned embodiment, each of Ring2 and Ring3 include four ring paths or wires, labeled and referred to herein as AD, AK, IV, and BL. Accordingly, since the messages are sent over separate physical interconnect paths, they are independent of one another from a transmission point of view.

In one embodiment, data is passed between nodes in a cyclical manner. For example, for each real or logical clock cycle (which may span one or more actual real clock cycles), data is advanced from one node to an adjacent node in the ring. In one embodiment, various signals and data may travel in both a clockwise and counterclockwise direction around the ring. In general, the nodes in Ring2 and Ring 3 may comprise buffered or unbuffered nodes. In one embodiment, at least some of the nodes in Ring2 and Ring3 are unbuffered.

Each of Ring2 and Ring3 include a plurality of nodes 1004. Each node labeled Cbo n (where n is a number) is a node corresponding to a processor core sharing the same number n (as identified by the core's engine number n). There are also other types of nodes shown in system 1000 including UPI nodes 3-0, 3-1, 2-0, and 2-1, an IIO (Integrated IO) node, and PCIe (Peripheral Component Interconnect Express) nodes. Each of UPI nodes 3-0, 3-1, 2-0, and 2-1 is operatively coupled to a respective UPI (Universal Path Interconnect) link interface 3-0, 3-1, 2-0, and 2-1. The IIO node is operatively coupled to an Input/Output interface 1010. Similarly, PCIe nodes are operatively coupled to PCIe interfaces 1012 and 1014. Further shown are a number of nodes marked with an "X"; these nodes are used for timing purposes. It is noted that the UPI, IIO, PCIe and X nodes are merely exemplary of one implementation architecture, whereas other architectures may have more or less of each type of node or none at all. Moreover, other types of nodes (not shown) may also be implemented.

Each of the link interfaces 3-0, 3-1, 2-0, and 2-1 includes circuitry and logic for facilitating transfer of UPI packets between the link interfaces and the UPI nodes they are coupled to. This circuitry includes transmit ports and receive ports, which are depicted as receive ports 1016, 1018, 1020, and 1022, and transmit ports 1024, 1026, 1028, and 1030. As further illustrated, the link interfaces are configured to facilitate communication over UPI links 1031, 1033, and 1035.

System 1000 also shows two additional UPI Agents 1-0 and 1-1, each corresponding to UPI nodes on rings of CPU sockets 0 and 1 (both rings and nodes not shown). As before, each link interface includes an receive port and transmit port, shown as receive ports 1032 and 1034, and transmit ports 1036 and 1038.

In the context of maintaining cache coherence in a multi-processor (or multi-core) environment, various mechanisms are employed to assure that data does not get corrupted. For example, in system 1000, each of processor cores 1002 corresponding to a given CPU is provided access to a shared memory store associated with that socket, as depicted by memory stores 1040-3 or 1040-2, which typically will comprise one or more banks of dynamic random access memory (DRAM). For simplicity, the memory interface circuitry for facilitating connection to the shared memory store is not shown; rather, the processor cores in each of Ring2 and Ring3 are shown respectively connected to the memory store via a home agent node 2 (HA 2) and a home agent node 3 (HA 3).

As each of the processor cores executes its respective code, various memory accesses will be performed. As is well known, modern processors employ one or more levels of memory cache to store cached memory lines closer to the core, thus enabling faster access to such memory. However, this entails copying memory from the shared (i.e., main) memory store to a local cache, meaning multiple copies of the same memory line may be present in the system. To maintain memory integrity, a cache coherency protocol is employed. Under the well-known MESI cache coherency protocol, when a processor (or core) makes a first copy of a memory line from main memory to its local cache, a mechanism is employed to mark the cache line as Exclusive (E), such that another core attempting to access the same memory line knows it does not have exclusive access to the memory line. If two or more cores have copies of the same cache line and the data in the line has not been changed (i.e., the data in the caches is the same as the line in main memory), the cache lines are in a shared (S) state. Once a change is made to the data in a local cache, the line is marked as modified (M) for that cache, and the other copies of the line are marked as Invalid (I), since they no longer reflect the changed state of data for the line. The state returns to Exclusive once the value in the modified cache line is written back to main memory.

Some Intel® Corporation processors further include a Forward or "F" state added to a modified MESI cache coherency protocol called the MESIF cache coherency protocol. The F state indicates that a cache should act as a designated responder for any requests for the given line. In a system of caches employing the MESI protocol, a cache line request that is received by multiple caches holding a line in the S state will receive multiple responses. In a system of caches employing the MESIF protocol, a cache line request will be responded to only by the cache holding the line in the F state.

It is noted that the MESI and MESIF protocols are examples of cache coherency protocols, and accordingly these are not to be limiting, but are used herein to explain the use of exemplary message classes that correspond to messages that are transferred around rings and across CPU sockets in accordance with the architectures disclosed herein.

It is also common to have multiple levels of caches, with caches closest to the processor core having the least latency and smallest size, and the caches further away being larger but having more latency. For example, a typical configuration might employ first and second level caches, commonly referred to as L1 and L2 caches. Another common configuration may further employ a third level or L3 cache.

In the context of system 1000, the highest level cache is termed the Last Level Cache, or LLC. For example, the LLC for a given core may typically comprise an L3-type cache if L1 and L2 caches are also employed, or an L2-type cache if the only other cache is an L1 cache. Of course, this could be extended to further levels of cache, with the LLC corresponding to the last (i.e., highest) level of cache.

In the illustrated configuration of FIG. 10, each processor core 1002 includes a processing engine 1042 coupled to an L1 or L1/L2 cache 244, which are "private" to that core. Meanwhile, each processor core is also co-located with a "slice" of a distributed LLC 1046, wherein each of the other cores has access to all of the distributed slices. Under one embodiment, the distributed LLC is physically distributed among N cores using N blocks divided by corresponding address ranges. Under this distribution scheme, all N cores communicate with all N LLC slices, using an address hash to find the "home" slice for any given address. Suitable interconnect circuitry is employed for facilitating communication between the cores and the slices; however, such circuitry is not show in FIG. 10 for simplicity and clarity.

As further illustrated, each of nodes 1004 in system 1000 is associated with a cache agent 1048, which is configured to perform messaging relating to signal and data initiation and reception in connection with a coherent cache protocol implemented by the system, wherein each cache agent 1048 handles cache-related operations corresponding to addresses mapped to its collocated LLC 1046. In addition, in one embodiment each of home agents HA2 and HA3 employ respective cache filters 1050 and 1052, and the various caching and home agents access and update cache line usage data stored in a respective directory 1054-2 and 1054-3 that is implemented in a portion of shared memory 1040-2 and 1040-3. It will be recognized by those skilled in the art that other techniques may be used for maintaining information pertaining to cache line usage.

Figure 10A:
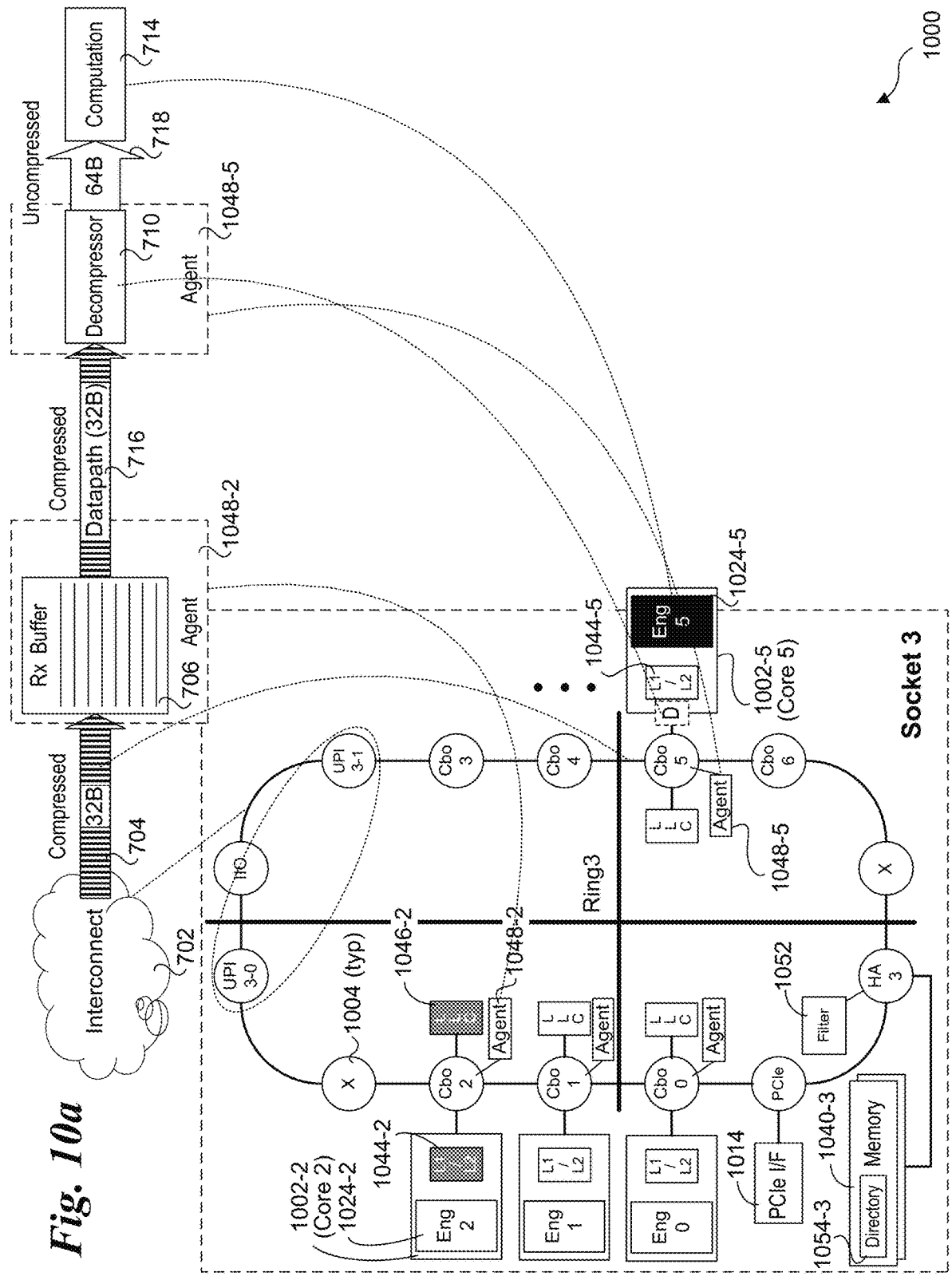
FIG. 10a is a diagram illustrating implementation of a cacheline transfer in a single processor corresponding to socket 3 of FIG. 10, wherein the delayed decompression scheme of FIG. 7b is implemented, according to one embodiment.

FIG. 10*a* shows a first example of the second delayed decompression scheme used in conjunction with a cacheline transfer within a single processor (the Socket 3 processor in the illustrated embodiment). The cacheline data to be transferred is stored in either one of the L1 or L2 caches 1044-2 associated with core 2 (core 1002-2), or the LLC slice 1046-2 associated with core. The destination is the engine 1024-5 or core 5 (core 1002-5). In one embodiment, the datapath between a core and its Cbo node is 32 B wide. Alternatively, the datapath if 64 B wide. In the embodiment illustrated in FIG. 10*a*, Rx buffer 706 is associated with the agent 1048-2 for Cbo node 2. Datapath 716 corresponds to the datapath of the Ring3 interconnect, which is 32 B wide. In one embodiment, decompressor 710 is associated with the agent for the Cbo node to which the destined core is coupled, and thus is associated with agent 1048-5 for Cbo node 5. Alternatively, decompressor 710 is coupled to L1/L2 cache 1044-5 of core 5.

Figure 10B:
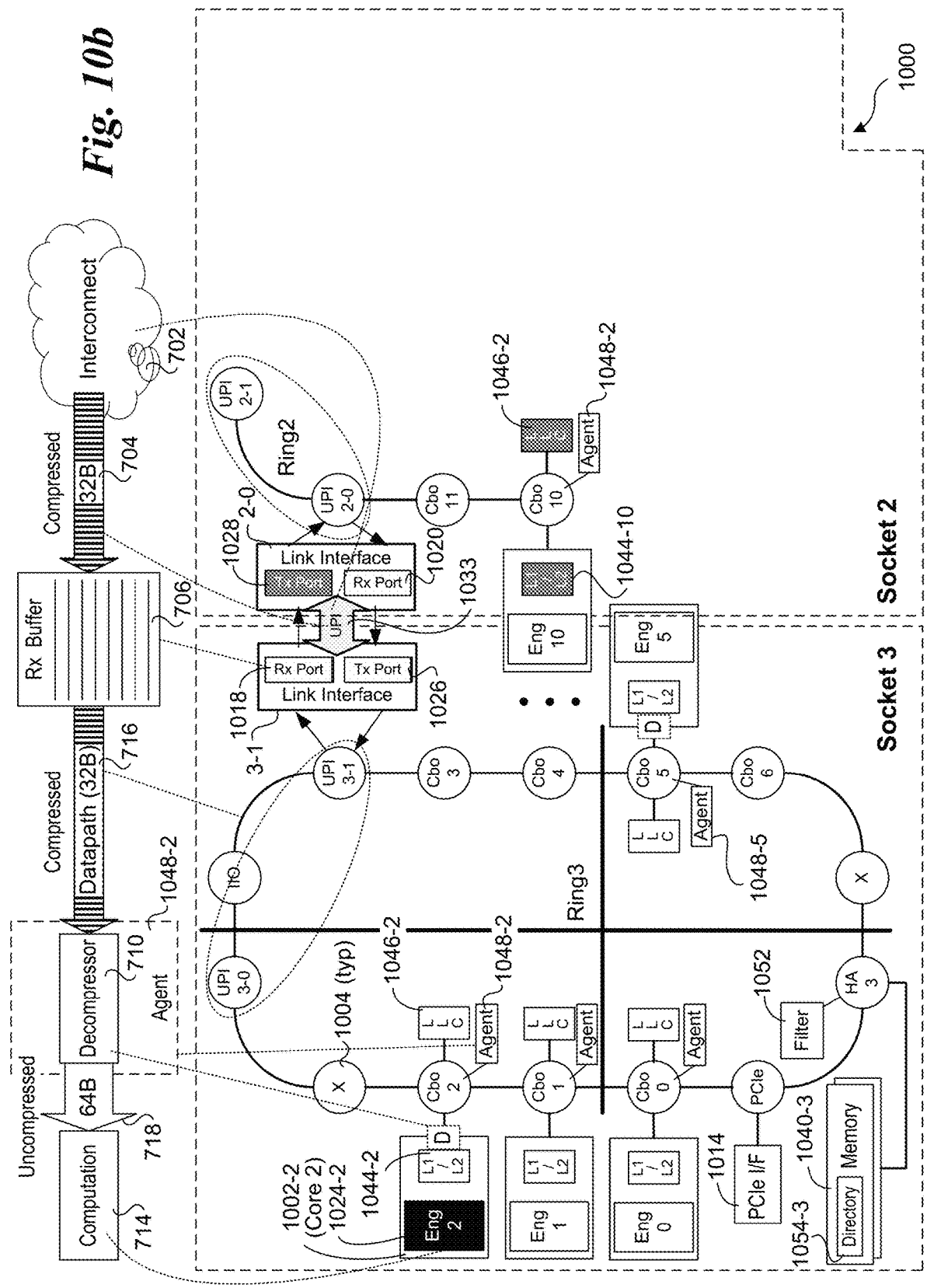
FIG. 10b is a diagram illustrating implementation of the delayed decompression scheme of FIG. 7b using a socket-to-socket link coupled between Socket 2 and Socket 3 of FIG. 10, according to one embodiment.

FIG. 10*b* shows a second example of the second delayed decompression scheme used in conjunction with a cacheline transfer between processors in respective sockets (Sockets 2 and 3) over portions of Ring2 and Ring3 and UPI link 1033. In this example, the cacheline originates in either the L1 or L2 cache 1044-10 of core 10 of Socket 2 or core 10's associated LLC slice 1046-10. In one embodiment, the cacheline, which is 64 B, is compressed by agent 1048-2 into a 32 B compressed packet that is sent over the portion of Ring2 from Cbo 10 to the UPI-2-0 node, where it forwarded to link interface 2-0 and buffered in Tx port 1028 and subsequently forwarded over UPI link 1033, which corresponds to interconnect 702 and has a 32 B wide datapath 704. Under another embodiment, the 64 B cacheline is split into two 32 B uncompressed packets by agent 1048-2 (who another component that is not shown), which are then sent over the portion of Ring2 from Cbo node 10 to the UPI-2-0 node, and then forwarded to link interface 2-0. At link interface 2-0, the data from the two uncompressed packets are combined to regenerate the 64 B cacheline and then compressed at Tx port 1028 into a 32 B compressed packet. The 32 B compressed packet is then forwarded over UPI link 1033 to link interface 3-1. Upon receipt by link interface 3-1 (under either of the foregoing compression schemes), the 32 B compressed packet is buffered in Rx buffer 706, which is associated with Rx port 1018. The 32 B compressed packet is then forwarded from Rx port 1018 to UPI node 3-1 and then over a portion of the Ring3 interconnect, which corresponds to 32 B datapath 716, from UPI node 3-1 to CBo node 2. The 32 B compressed packet is then decompressed by either agent 1048-2 or a decompressor 710 associated with L1/L2 cache 1044-2, and subsequently consumed (accessed) by core 2's engine 1024-2 to perform a computation associated with computation block 714.

Under an alternative approach, the packet data is compressed prior to sending the data over a UPI link (or other type of socket-to-socket link) and decompressed at the receive-side interface prior to inserting the data into the ring interconnect. More generally, this approach could be used with other types of interconnects, as well, including mesh-type interconnects and torus-type interconnects.

Figure 11:
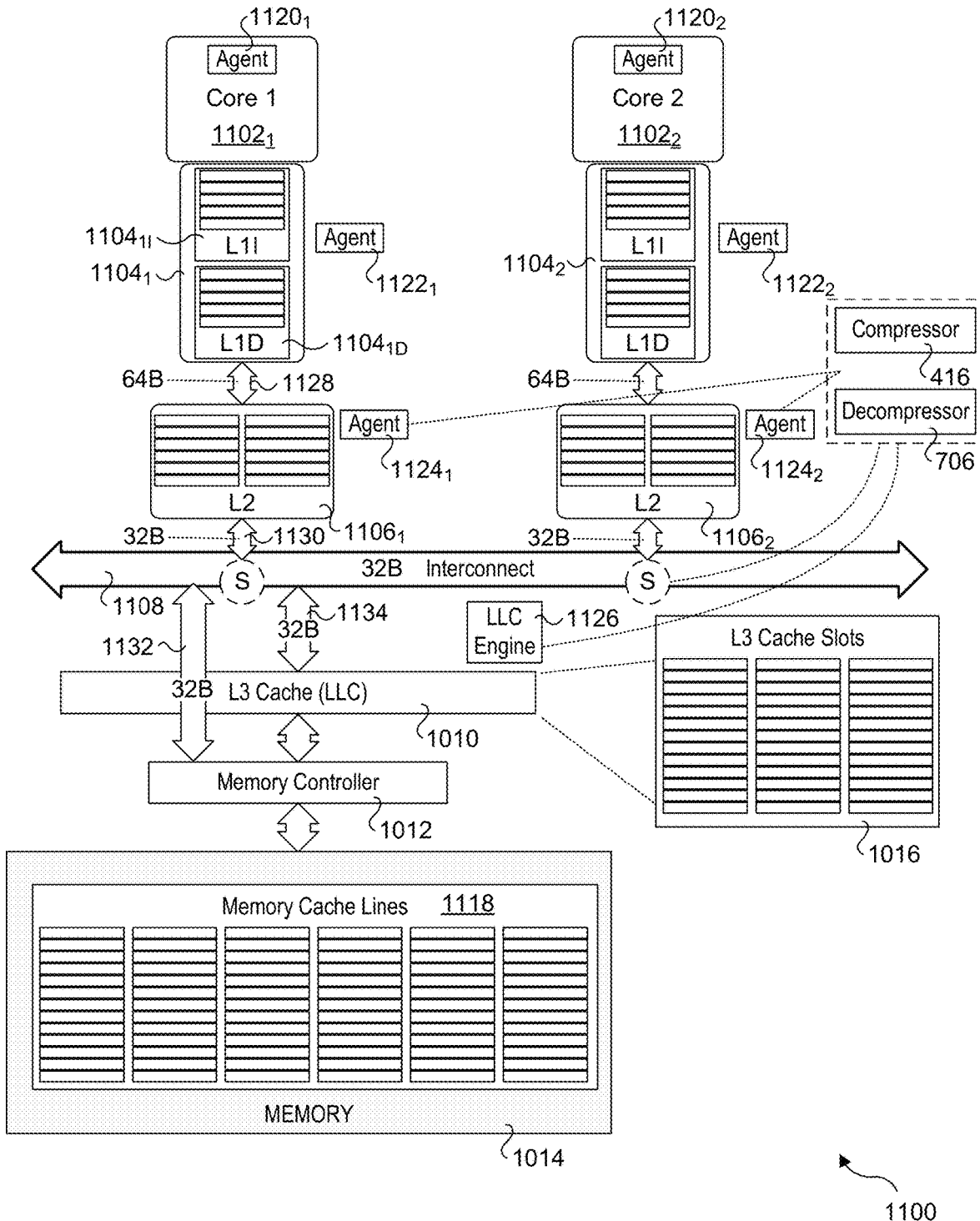
FIG. 11 is diagram of a processor architecture including a multi-level cache hierarchy implementing a coherent memory system in which aspects of the embodiments herein may be implemented.

FIG. 11 shows a processor architecture 1100 having a coherent memory architecture including processor cores, L1 and L2 caches, an LLC, and system memory. Processor architecture 1100 includes a two processor cores 1102$_1$ and 1102$_2$ (also labeled Core 1 and Core 2), coupled to a respective L1 cache 1104. As illustrated by L1 cache 1104$_1$, each L1 cache includes an L1 instruction cache (L1I) and an L1 data cache (L1D), respectively depicted as L1I 1104$_{1I}$ and L1D 1104$_{ID}$. Each L1 cache is coupled to an L2 cache 1106, which in turn is coupled to an interconnect 1108. An L3 cache 1010, which operates as the LLC is also connected to the interconnect 1108, as is a memory controller 1012 which provides access to system memory 1014. L3 cache 1010 includes a plurality of L3 cache slots 1016 used to store cachelines, while system memory 1014 includes memory cachelines 1018. In one embodiment, the cachelines in each of the levels of the cache hierarchy (e.g., L1, L2, L3/LLC, and memory) are 64 B cachelines.

Communications between the various cache levels and system memory are facilitated by various agents, including core agents 1120, L1 agents 1122, L2 agents 1124, and an LLC engine 1126. As further depicted, each L1 cache is connected to its associated L2 cache via a 64 B datapath 1128, while each L2 cache is connected to interconnect 1108 via a 32 B datapath 1130. Interconnect 1108 also employs one or more 32 B wide datapaths, while interconnect datapaths 1132 and 1134 respectively coupling memory controller 1012 and L3 cache 1010 to interconnect 1108 are also 32 B wide datapaths. In some embodiment, a component such as a Cbo node, router, or switch (as depicted by switches 'S' shown in dashed circles) is used to couple an L2 cache 1106 to interconnect 1108.

Generally, the compression and decompression operations discussed herein may be implemented at various ingress and egress points in the interconnect structure where it would be advantageous to do so. For example, as shown in FIG. 11, one or both of a compressor 416 and decompressor 706 may be implemented by the L2 agents 1124₁ and 1124₂ and/or LLC engine 1126, in a switch 'S' (or Cbo node or router), or an agent associated with a switch, Cbo node or router (not shown). In the case of decompression and compression being implemented by LLC engine 1126, some of the 64 B cachelines in L3 cache 1010 may be split into two 32 B halves, each storing a compressed 64 B cacheline. Utilization of compressed cacheline data will depend on the compressibility of the data for a given cacheline, as discussed above. For example, in one embodiment the compression ratio threshold is 2:1, enabling cachelines with a compressibility of at least 2:1 to be stored in a 32 B half of a 64 B cacheline. Cachelines having cacheline data that cannot be compressed with a compression level of at least 2:1 are left uncompressed.

Generally, the principles and teachings disclosed herein may be applied to various types of processor architecture, as well as system architectures coupling components and interfaces in communication using various types of interconnect configurations, including ring-type interconnects, torus-type interconnects, mesh-type interconnects, or other types of interconnect structures known in the art. For instance, an example of a mesh-type interconnect architecture is shown in FIG. 12.

Figure 12:
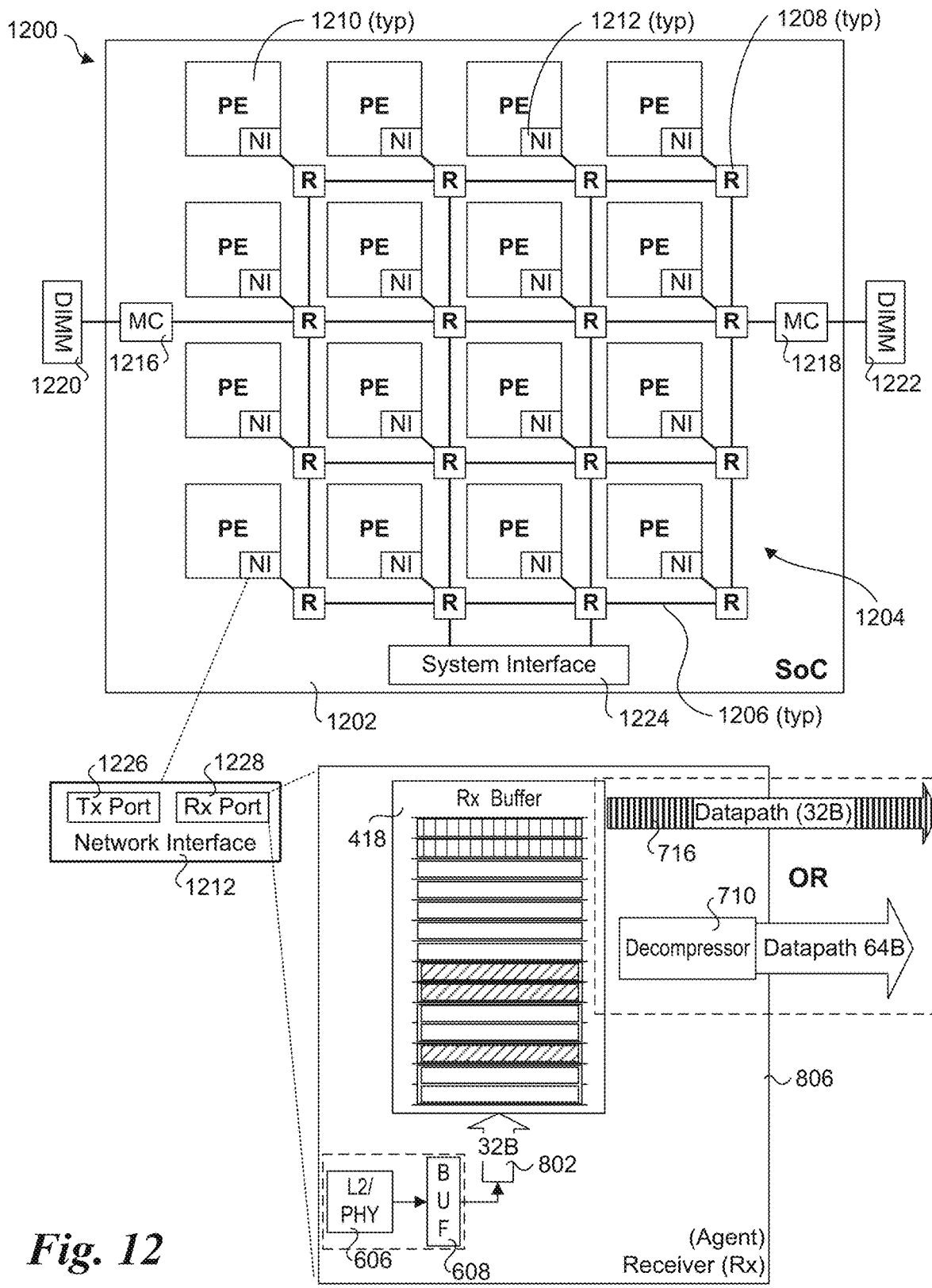
FIG. 12 is a schematic block diagram of an exemplary System on a Chip (SoC) including a 2D mesh interconnect architecture coupling a plurality of processing element in communication, and further depicting implementing aspects of the delayed decompression schemes disclosed herein in the receiver ports of the network interfaces.

In further detail, FIG. 12 depicts a system 1200 including a SoC 1202 having an exemplary configuration under which aspects of the embodiments described herein may be implemented. SoC 1202 includes a Network on a Chip (NoC) 1204 comprising a 2D Mesh interconnect fabric having a plurality of interconnect links 1206 and a plurality of routers 1208 (also depicted as 'R's). Each router includes a local module that is coupled to a respective processing element (PE) 1210 at a network interface (NI) 1212, forming a 2D array of PE's. Although 16 PE's are shown in FIG. 12, this is merely for illustrative purposes, as the number of PE's can vary from a lesser number of PE's to many more, such as but not limited to 8, 24, 32, 48, 64, etc., as well as numbers in-between.

The PE's are illustrative of various types of processing elements commonly used in SoCs, such as processor cores, hardware accelerators (e.g., video decoders, graphics, imaging, etc.), memory-related components (e.g., memory controllers), and I/O interfaces (e.g., PCIe, UPI, etc.). In the illustrated embodiment, a pair of memory controllers 1216 and 1218 are depicted as coupled to respective memory blocks 1220 and 1222 (depicted as DIMM (Dual in-line Memory Modules)) and to respective routers on SoC 1202. Also depicted is a system interface 1224, which is illustrative of one or more interfaces between SoC 1202 and other system components that are not shown. As will be recognized by those skilled in the art, an actual SoC would include additional components that are not shown in order to not obscure the aspects illustrated in FIG. 12.

As further shown in the lower half of FIG. 12, each network interface 112 includes a Tx port 1226 and an Rx port 1228. Rx port 1228 includes a receiver 806 in accordance with the receiver 806 in FIG. 8 (which includes decompressor 710) or FIG. 9 (packets in Rx buffer 418 are transferred over a 32 B datapath 716 to a decompressor that is external to receiver 806).

In addition to the scenarios above, many interconnects (including mesh interconnects) will move data to storage (temporary or long term). This could include a disk, a memory, a cache, etc. In the case of a multi-level coherent memory hierarchy, data is often stored in the LLC, where it is later read and used by a core. A structure like the LLC may appear like the buffer in the delayed decompression scheme of FIG. 7b above, where the data is stored compressed and only decompressed once it reaches the core where it will be consumed. This provides a bandwidth savings travelling to the LLC, bandwidth savings traveling to the core, and the possibility of expanding the capacity of the LLC by storing additional compressed lines in existing space.

The delayed decompression schemes described and illustrated herein provide several benefits. First, the schemes lower the cost of implementing link compression, a feature that provides performance benefits. Expanding the write throughput of buffers and/or datapaths to support burst throughput is very expensive in terms of increased design complexity and area. This approach enables reuse of such buffers and datapaths as-is, making it easier to add link compression. Second, keeping data in compressed form as it moves through the data path of the consuming agent makes it possible to provide higher bandwidth to computation engines, resulting in higher performance. Additionally, even when additional bandwidth is not important, keeping data compressed can lower the power needed to move and store data. This power can then reduce the overall chip power or be diverted to computation for higher performance.

Generally, the Tx control logic and Rx control logic blocks described and illustrated herein may be used to control operations of their associated transmitters and receivers, which are hardware-based components. As such, the Tx and Tx control logic blocks are likewise hardware-based components that may be implemented via some form of embedded logic, such as through fixed or programmable logic implemented in circuitry (e.g., an ASIC (Application Specific Integrated Circuit) or FPGA (Field Programmable Gate Array), an embedded processor, processing element or engine executing instructions configured perform the associated functions, or a combination of these schemes. Moreover, all of the compression and decompression operations disclosed and claimed herein are implemented in hardware or are otherwise referred to as hardware-based compression and decompression. It will be understood by those skilled in the art that hardware-based compression and decompression are fundamentally different than software-based compression and decompression, since the latter refers to compression and decompression operations implemented via software executing on a processor (as opposed implementation using hardware-based logic), noting that both hardware-based compression and software-based compression may use the same or similar compression and decompression algorithms.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. Additionally, "communicatively coupled" means that two or more elements that may or may not be in direct contact with each other, are enabled to communicate with each other. For example, if component A is connected to component B, which in turn is connected to component C, component A may be communicatively coupled to component C using component B as an intermediary component.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Italicized letters, such as 'm' and 'n', in the foregoing detailed description are used to depict an integer number, and the use of a particular letter is not limited to particular embodiments. Moreover, the same letter may be used in separate claims to represent separate integer numbers, or different letters may be used. In addition, use of a particular letter in the detailed description may or may not match the letter used in a claim that pertains to the same subject matter in the detailed description.

As described herein, aspects of the principles and teachings disclosed herein may be implemented in processors and other integrated circuits, including semiconductor chips such as SoCs. In addition, embodiments may be implemented within machine-readable media. For example, the designs described above may be stored upon and/or embedded within non-transitory machine readable media associated with a design tool used for designing semiconductor devices. Examples include a netlist formatted in the VHSIC Hardware Description Language (VHDL) language, Verilog language or SPICE language. Some netlist examples include: a behavioral level netlist, a register transfer level (RTL) netlist, a gate level netlist and a transistor level netlist. Machine-readable media also include media having layout information such as a GDS-II file. Furthermore, netlist files or other machine-readable media for semiconductor chip design may be used in a simulation environment to perform the methods of the teachings described above.

As used herein, a non-transitory computer-readable or machine-readable storage medium includes any mechanism for storing or transmitting information in a form readable by a machine (e.g., a computer). For example, a non-transitory computer-readable or machine-readable storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.).

The operations and functions performed by various components described herein may be implemented by firmware executed on one or more processing elements, via embedded hardware or the like, or a combination of embedded hardware and firmware. Generally, such components may be implemented as hardware modules, special-purpose hardware (e.g., application specific hardware or programmable logic devices such as FPGAs, ASICs, DSPs, etc.), embedded controllers, hardwired circuitry, hardware logic, etc.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method comprising: receiving, via an interconnect link at a receiver, a burst of packets comprising a plurality of 32 Byte (B) packets sequentially transmitted over the interconnect link, at least a portion of the plurality of packets comprising compressed packets containing compressed data;

buffering each of the plurality of packets in a receive buffer in conjunction with receiving the packet;

delaying decompression of the compressed packets, under which the compressed packet are not decompressed in conjunction with being received; and decompressing a compressed packet at the receiver in conjunction with forwarding the data contained in the compressed packet to a consumer, wherein the data is forwarded over a 64 B Datapath between the receiver or a component in which the receiver is implemented and the consumer.

2. The method of claim 1, wherein the interconnect link is coupled between a transmitter and a receiver, and wherein the data in the compressed packets are compressed at the transmitter.

3. The method of claim 1, wherein the data in the compressed packets have been compressed using a compression ratio of at least 2:1.

4. The method of claim 3, wherein each of at least a portion of the compressed packets contains data corresponding to a respective 64 B cacheline.

5. The method of claim 1, wherein a portion of the plurality of packets comprise uncompressed packets containing uncompressed data corresponding to a 64 B cacheline, wherein data for a given 64 B cacheline is received via a sequence of first and second 32 B uncompressed packets, further comprising:

buffering the first and second 32 B uncompressed packets in the receive buffer in conjunction with receiving the first and second uncompressed packets;

accessing the first and second 32 B uncompressed packets from the receive buffer;

combining data from the first and second 32 B packets to regenerate the 64 B cacheline; and forwarding data corresponding to the 64 B cacheline over the 64 B datapath.

6. The method of claim 1, further comprising:

accessing a compressed packet buffered in the receiver buffer;

forwarding the compressed packet over a 32 B datapath to a decompressor;

decompressing the compressed packet to produce uncompressed data; and forwarding the uncompressed data over a 64 B datapath to a consumer.

7. The method of claim 1, wherein the method is implemented in a processor.

8. The method of claim 1, wherein the interconnect link is a socket-to-socket link coupling a first processor installed in a first socket to a second processor installed in a second socket, and wherein the receiver is implemented in a socket-to-socket link interface.

9. The method of claim 1, where the interconnect link has a bandwidth and the packets are written to the receive buffer at a bandwidth that matches the bandwidth of the interconnect link.

10. A link interface, configured to be coupled to an interconnect link, comprising:

a receiver including,
a Physical Layer (PHY) block;
a Layer 2 block, coupled to the PHY block or integrated with the PHY in a L2/PHY block;
a receive buffer; and
control logic configured to control operation of the receiver to enable the receiver to,
receive a burst of packets comprising a plurality of packets sequentially transmitted over the interconnect link, at least a portion of the plurality of packets comprising compressed packets containing compressed data; and buffer each of the plurality of packets in the receive buffer in conjunction with receiving each packet, wherein the packets are buffered in the receive buffer without decompression.

11. The link interface of claim 10, wherein the data in the compressed packets have been compressed using a compression ratio of at least 2:1.

12. The link interface of claim 11, wherein the plurality of packets comprise 32 Byte (B) packets and wherein each compressed packet contains data corresponding to a respective 64 B cacheline.

13. The link interface of claim 12, further comprising a decompressor, wherein the control logic is further configured to enable the link interface to:

access a compressed packet from the receive buffer;
decompress data in the compressed packet to regenerate a 64 B cacheline; and
forward data corresponding to the 64 B cacheline outbound from the receiver toward a consumer via a 64 B datapath coupled to the link interface.

14. The link interface of claim 13, wherein a portion of the plurality of packets that are received comprise uncompressed packets containing uncompressed data corresponding to a 64 B cacheline, wherein data for a given 64 B cacheline is received via a sequence of first and second 32 B uncompressed packets, and wherein the control logic is further configured to enable the link interface to:

buffer the first and second uncompressed packets in the receive buffer in conjunction with receiving the first and second uncompressed packets;
access the first and second uncompressed packets from the receive buffer;
combine data from the first and second packets to regenerate the 64 B cacheline; and
forward data corresponding to the 64 B cacheline toward the consumer over the 64 B datapath.

15. The link interface of claim 12, wherein the control logic is further configured to enable the link interface to:

access a compressed packet from the receiver buffer; and
forward the compressed packet outbound from the receiver toward a decompressor via a 32 B datapath coupled between the receiver and the decompressor.

16. The link interface of claim 10, wherein the link interface is coupled via the interconnect link to a peer link interface, and wherein the data in the compressed packets are compressed at the peer link interface.

17. The link interface of claim 10, wherein the interconnect link is a socket-to-socket link coupling a first processor installed in a first socket to a second processor installed in a second socket, and wherein the link interface is implemented in the second processor.

18. The link interface of claim 10, where the interconnect link has a line rate at which respective packets of the plurality of packets are received, and wherein the receiver is configured to write packet data to the receive buffer at the line rate.

19. The link interface of claim 18, wherein the interconnect link has a datapath width of 32 Bytes (B) and the line rate is 32 B per cycle, and the receiver has a write datapath width of 32 B and writes packet data to the receive buffer at a rate of 32 B per cycle.

20. A system on a chip (SoC), comprising:
a plurality of processor elements, each having at least one cache level, interconnected by interconnect circuitry;

a link interface including a receiver, coupled to an interconnect link in the interconnect circuitry, the receiver comprising,
a Physical Layer (PHY) block;
a Layer 2 block, coupled to the PHY block or integrated in a PHY/L2 block;
a receive buffer; and
control logic configured to control operation of the receiver to enable the receiver to,
receive a burst of packets comprising a plurality of packets sequentially transmitted over the interconnect link, at least a portion of the plurality of packets comprising compressed packets containing compressed data; and
buffer each of the plurality of packets in the receive buffer in conjunction with receiving each packet, wherein the packets are buffered in the receive buffer without decompression.

21. The SoC of claim 20, wherein the data in the compressed packets have been compressed using a compression ratio of at least 2:1.

22. The SoC of claim 21, wherein the SoC includes a cache hierarchy including a Level 1 (L1) and Level 2 (L2) cache associated with each processor element, each L1 and L2 cache including a plurality of 64 Byte (B) cachelines, wherein the plurality of packets comprise 32 (B) packets, and wherein one or more of the compressed packets contains data corresponding to a respective 64 B cacheline, and wherein the processor elements comprise processor cores.

23. The SoC of claim 22, wherein the receiver further comprises a decompressor, wherein the SoC includes a 64 B datapath between the receiver and a processing element (PE), and wherein the control logic in the receiver is further configured to:
access a compressed packet from the receive buffer;
decompress data in the compressed packet to regenerate a 64 B cacheline; and
forward data corresponding to the 64 B cacheline to the PE via the 64 B datapath.

24. The SoC of claim 23, wherein a portion of the plurality of packets that are received comprise uncompressed packets containing uncompressed data corresponding to a 64 B cacheline, wherein data for a given 64 B cacheline is received via a sequence of first and second uncompressed packets, and wherein the control logic in the receiver is further configured to:
buffer the first and second uncompressed packets in the receive buffer in conjunction with receiving the first and second uncompressed packets;
access the first and second uncompressed packets from the receive buffer;
combine data from the first and second packets to regenerate the 64 B cacheline; and
forward data corresponding to the 64 B cacheline to the PE via the 64 B datapath.

25. The SoC of claim 22, wherein the SoC further includes a decompressor, wherein the SoC includes a 32 B datapath between the receiver and the decompressor and a 64 B datapath coupled between the decompressor and one of an L2 cache and a processor element comprising a processor core, and wherein the control logic in the receiver is further configured to:
access a compressed packet from the receiver buffer;
forward the compressed packet from the receiver to the decompressor via the 32 B datapath;
decompress the packet to regenerate a 64 B cacheline; and
forward data corresponding to the 64 B cacheline over the 64 B datapath to the L2 cache or the processor core coupled to the 64 B datapath.

26. The SoC of claim 20, wherein the SoC is configured to be installed in a socket of a multi-socket system, wherein the interconnect link to which the link interface is coupled comprises a socket-to-socket link.

27. The SoC of claim 20, wherein the interconnect link has a datapath width of 32 Bytes (B) and a line rate of 32 B per cycle, and the receiver has a write datapath width to the receive buffer of 32 B and is configured to write packet data to the receive buffer at a rate of 32 B per cycle.

28. The SoC of claim 20, wherein the interconnect circuitry includes a ring interconnect structure including the interconnect link or to which the interconnect link is coupled.

29. The SoC of claim 20, wherein the interconnect circuitry comprising a mesh interconnect structure including the interconnect link or to which the interconnect link is coupled.

* * * * *